United States Patent
Tsuruya

(10) Patent No.: US 7,466,110 B2
(45) Date of Patent: Dec. 16, 2008

(54) POWER FACTOR IMPROVING CIRCUIT

(75) Inventor: Mamoru Tsuruya, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 47 days.

(21) Appl. No.: 10/576,708

(22) PCT Filed: Jul. 26, 2005

(86) PCT No.: PCT/JP2005/013623

§ 371 (c)(1),
(2), (4) Date: Apr. 21, 2006

(87) PCT Pub. No.: WO2006/022107

PCT Pub. Date: Mar. 2, 2006

(65) Prior Publication Data

US 2007/0103949 A1    May 10, 2007

(30) Foreign Application Priority Data

Aug. 27, 2004 (JP) .............................. 2004-248548

(51) Int. Cl.
G05F 1/70 (2006.01)
G05F 1/00 (2006.01)

(52) U.S. Cl. .................. 323/207; 323/222; 323/282

(58) Field of Classification Search ................. 323/222, 323/223, 282, 284–285, 286, 259, 207
See application file for complete search history.

(56) References Cited

U.S. PATENT DOCUMENTS

| | | | | |
|---|---|---|---|---|
| 5,654,626 A | * | 8/1997 | Karlsson | 323/222 |
| 5,736,842 A | * | 4/1998 | Jovanovic | 323/222 |
| 7,012,413 B1 | * | 3/2006 | Ye | 323/284 |
| 7,046,528 B2 | * | 5/2006 | Sankman et al. | 363/41 |
| 2002/0180413 A1 | * | 12/2002 | Umminger et al. | 323/284 |

(Continued)

FOREIGN PATENT DOCUMENTS

JP    5-68375    3/1993

(Continued)

OTHER PUBLICATIONS

English machine translation of N.*

(Continued)

Primary Examiner—Shawn Riley
(74) Attorney, Agent, or Firm—Oblon, Spivak, McClelland, Maier & Neustadt, P.C.

(57) ABSTRACT

A power factor improving circuit including: a boost reactor that inputs a rectified voltage obtained by rectifying an AC power supply voltage of an AC power supply by a rectifier circuit; a main switch that inputs the rectified voltage through the boost reactor and is turned on/off; a converting section that converts a voltage obtained when the main switch is turned on/off into a DC output voltage; and a control section that controls turn-on/off of the main switch to shape an AC power supply current to a sine wave form, controls an output voltage of the converting section to a predetermined voltage, and controls a switching frequency of the main switch according to a value of current flowing into the AC power supply, or that of current flowing into the rectifier, or that of current flowing into the main switch.

18 Claims, 14 Drawing Sheets

U.S. PATENT DOCUMENTS

| | | | |
|---|---|---|---|
| 2003/0222627 A1* | 12/2003 | Hwang | 323/222 |
| 2004/0113596 A1* | 6/2004 | Peron | 323/282 |
| 2004/0263134 A1* | 12/2004 | Hussein et al. | 323/222 |
| 2005/0001602 A1* | 1/2005 | Umminger et al. | 323/282 |
| 2006/0012359 A1* | 1/2006 | Chiu | 323/284 |

FOREIGN PATENT DOCUMENTS

| | | |
|---|---|---|
| JP | 8-19259 | 1/1996 |
| JP | 08019259 A * | 1/1996 |
| JP | 8-182329 | 7/1996 |
| JP | 8-205539 | 8/1996 |
| JP | 08205539 A * | 8/1996 |
| JP | 10-28378 | 1/1998 |
| JP | 10-174428 | 6/1998 |
| JP | 10174428 A * | 6/1998 |
| JP | 11-178347 | 7/1999 |
| JP | 2000-37072 | 2/2000 |
| JP | 2004-7880 | 1/2004 |

OTHER PUBLICATIONS

English machine translation of O.*

* cited by examiner (a)

(b)

POWER FACTOR IMPROVING CIRCUIT

DESCRIPTION

1. Technical Field

The present invention relates to a power factor improving circuit, which is used in a switching power supply, with a high efficiency and low noise and a high power factor.

2. Background Art

FIG. 1 is a circuit configuration diagram of a conventional power factor improving circuit described in Unexamined Japanese Patent Publication No. 2000-37072. In the power factor improving circuit shown in FIG. 1, a series circuit, which includes a boost reactor L1, a main switch Q1 such as an MOSFET and a current sensing resistor R, is connected to both output terminals P1 and P2 of a full-wave rectifier circuit B1 that rectifies an AC power supply voltage from an AC power supply Vac1. A serial circuit, which includes a diode D1 and a smoothing capacitor C1, is connected across the main switch Q1. A load RL is connected across the smoothing capacitor C1. The main switch Q1 is turned on and off under control of PWM (Pulse Width Modulation) of a control circuit 100. The current sensing resistor R detects an input current flowing into the full-wave rectifier circuit B1.

The control circuit 100 includes an error amplifier 111, a multiplier 112, an error amplifier 113, an oscillator 114, and a PWM comparator 116.

In the error amplifier 111, a reference voltage E1 is input to a +terminal and a voltage of a smoothing capacitor C1 is input to a −terminal. The error amplifier 111 amplifies an error between the voltage of the smoothing capacitor C1 and the reference voltage E1 to generate an error voltage signal and output a result to the multiplier 112. The multiplier 112 multiplies the error voltage signal from the error amplifier 111 and a full-wave rectified voltage from the positive-side output terminal P1 of the full-wave rectifier circuit B1 and outputs a multiplied output voltage to a +terminal of the error amplifier 113.

In the error amplifier 113, voltage, which is proportional to the input current detected by the current sensing resistor R, is input to a −terminal and the multiplied output voltage from the multiplier 112 is input to a +terminal. The error amplifier 113 amplifies the error between the voltage due to the current sensing resistor R and the multiplied output voltage to generate an error voltage signal and output this error voltage signal as a feedback signal FB to the PWM comparator 116. The OSC (oscillator) 114 generates a triangular wave signal for a fixed period of time.

In the PWM comparator 116, the triangular wave signal from the OSC 114 is input to a −terminal and the feedback signal FB from the error amplifier 113 is input to a +terminal. The PWM comparator 116 generates a pulse signal, which is turned on when a value of the feedback signal FB is a value of the triangular wave signal or more and turned off when the value of the feedback signal FB is below the value of the triangular wave signal, and applies the pulse signal to a gate of the main switch Q1.

In other words, the PWM comparator 116 provides a duty pulse to the main switch Q1 according to a difference signal between the output of the current sensing resistor R due to the error amplifier 113 and that of the multiplier 112. The duty pulse is a pulse width control signal for continuously making compensation by the constant period for variations in the AC power supply voltage and DC load voltage. The aforementioned configuration controls an AC power supply current waveform to match an AC power voltage waveform to largely improve the power factor.

FIG. 2 is a view illustrating a timing chart of each of an AC power supply voltage waveform and a rectified output current waveform in a conventional power factor improving circuit. FIG. 3 shows details on a portion A in the timing chart shown in FIG. 2. Namely, FIG. 3 shows a switching waveform with a frequency of 100 kHz in the vicinity of a maximum value of the AC power supply voltage. FIG. 4 shows details on a portion B in the timing chart shown in FIG. 2. Namely, FIG. 4 shows a switching waveform with a frequency of 100 kHz at a portion where the AC power supply voltage is low.

An explanation will be next given of an operation of the above-structured power factor improving circuit with reference to the timing chart shown in FIG. 3. In addition, FIG. 3 illustrates a voltage $Q1v$ across the main switch Q1, a current $Q1i$ flowing into the main switch Q1, and a current $D1i$ flowing into the diode D1.

First, at a time $t_{31}$, the main switch Q1 is turned on, so that the current $Q1i$ flows into the main switch Q1 from the full-wave rectifier circuit B1 through the boost reactor L1. The current is linearly increased up to a time $t_{32}$ with the passage of time. It is noted that the current $D1i$ flowing into the diode D1 becomes zero during the period between the time $t_{31}$ and the time $_{32}$.

Next, at the time $t_{32}$, the main switch Q1 is changed from on to off. At this time, the voltage Q1V of the main switch Q1 is increased by energy stored in the boost reactor L1. Also, during the period between the time $t_{32}$ and a time 33, since the main switch Q1 is turned off, the current $Q1i$ flowing into the main switch Q1 becomes zero. Additionally, during the period between the time $t_{32}$ and the time $_{33}$, the current $D1i$ flows through a route of B1→L1→D1→C1→R→B1 to supply power to the load RL.

3. Disclosure of Invention

By the way, in order to miniaturize the boost reactor L1, in general, the frequency must be set to high (for example, 100 kHz). However, at the portion A where current, which corresponds to a portion in the vicinity of the maximum value of the AC power supply voltage, is high, even in the case of the high frequency, energy stored in the boost reactor L1 is supplied to the load RL through the diode D1 when the main switch Q1 is turned off.

However, at the portion B where voltage is low, the amount of current is small and the current, which is obtained when the main switch Q1 is turned off, is low. Moreover, the main switch Q1, which is the MOSFET, has an internal capacitance (parasitic capacitance), which is not shown. In the main switch Q1, power loss occurs by an amount $(CoV^2/2)$ decided by the internal capacitance $C_0$ and applied voltage V. The power loss is increased in proportion to the frequency.

Moreover, the amount of energy stored in the boost reactor L1 is small due to the internal capacitance of the main switch Q1. For this reason, when the main switch Q1 is turned off, the voltage $Q1v$ is shaped to a sine wave as shown in FIG. 4 and is not increased up to an output voltage, resulting in an increase in power loss. In other words, efficiency will be reduced.

An object of the present invention is to provide a power factor improving circuit that decreases a switching frequency at a portion where an input current is low or stops an operation to reduce power loss at the portion where an input current is low, making it possible to achieve miniaturization, high efficiency, and noise reduction.

A power factor improving circuit of the present invention includes a boost reactor that inputs a rectified voltage obtained by rectifying an AC power supply voltage of an AC power supply by a rectifier circuit; a main switch that inputs the rectified voltage through the boost reactor and is turned on/off; a converting section that converts a voltage, which is obtained when the main switch is turned on/off, into a DC output voltage; and a control section that controls turn-on/off of the main switch to shape an AC power supply current to sine wave form, controls an output voltage of the converting section to a predetermined voltage, and controls a switching frequency of the main switch according to a value of current flowing into the AC power supply or that of current flowing into the rectifier circuit or that of current flowing into the main switch.

Moreover, a power factor improving circuit includes a boost reactor that has a primary winding, and a feed back winding connected to the primary winding in series and loosely coupled to the primary winding; a first series circuit that is connected between one output terminal of a rectifier circuit that rectifies an AC power supply voltage of an AC power supply and an other output terminal thereof, and includes the primary winding of the boost reactor, a first diode, and a smoothing capacitor; a second series circuit that is connected between the one output terminal of the rectifier circuit and another output terminal thereof, and includes the primary winding of the boost reactor, the feedback winding, and a main switch; a second diode that is connected between a junction of the main switch and the feedback winding and the smoothing capacitor; and a control section that controls turn on/off of the main switch to shape an AC power supply current to a sine wave, controls an output voltage of the smoothing capacitor to a predetermined voltage, and controls a switching frequency of the main switch according to a value of current flowing into the AC power supply or that of current flowing into the rectifier circuit or that of current flowing into the main switch.

BRIEF DESCRIPTION OF DRAWINGS

FIG. 22(*b*) is a configuration diagram illustrating a second example of the pulse width modulator included in the control circuit in the power factor improving circuit according to Embodiment 7.

FIG. 24(*b*) is a view illustrating a second example of an I/O characteristic of the pulse width modulator.

BEST MODE FOR CARRYING OUT THE INVENTION

The following will specifically explain embodiments of the power factor improving circuit according to the present invention.

The power factor improving circuit according to embodiments of the present invention changes a switching frequency of a main switch according to a value of current flowing into an AC power supply or that of current flowing into a rectifier circuit or that of current flowing into the main switch, namely, a value of the input current, thereby reducing the switching frequency or stopping a switching operation at a portion where the input current is low. This makes it possible to decrease power loss of the portion where the input current is low and achieve miniaturization, high efficiency, and noise reduction.

EMBODIMENT 1

Figure 5:
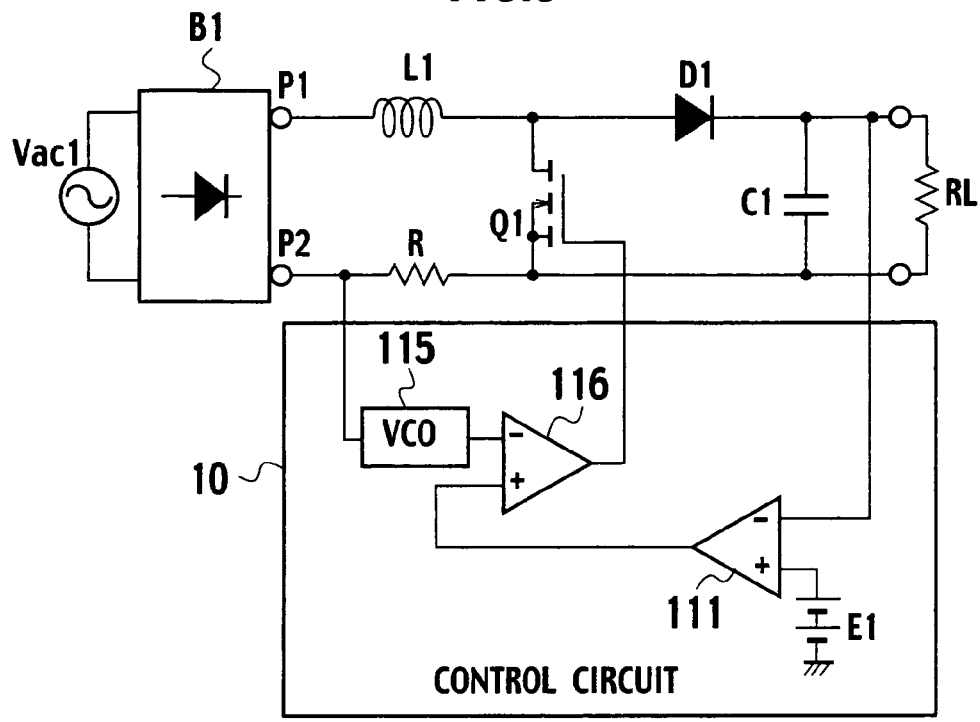
FIG. 5 is a circuit configuration diagram illustrating a power factor improving circuit according to Embodiment 1.
Figure 6:
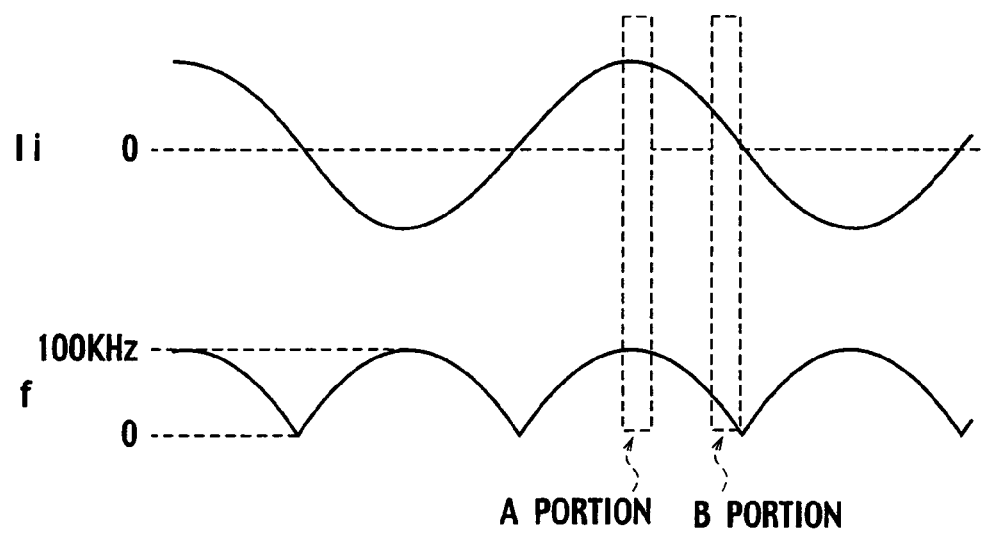
FIG. 6 is a timing chart illustrating each of an input current waveform and a switching frequency of the power factor improving circuit according to Embodiment 1.

FIG. 5 is a circuit configuration diagram illustrating a power factor improving circuit according to Embodiment 1. FIG. 6 is a timing chart illustrating each of an input current waveform and a switching frequency of the power factor improving circuit according to Embodiment 1. FIG. 6 shows that the switching frequency f of the main switch Q1 changes form zero to, for example, 100 kHz when input current Ii changes from zero to a maximum value.

In Embodiment 1, when the input current is a lower limit setting current or less, the switching frequency of the main switch is set to a lower limit frequency (for example, 20 kHz). When the input current is an upper limit setting current or more, the switching frequency of the main switch is set to an upper limit frequency (for example, 100 kHz). When the input current ranges from the lower limit setting current to the upper limit setting current, the switching frequency of the main switch is gradually changed from the lower limit frequency to the upper limit frequency.

In the power factor improving circuit shown in FIG. 5, the input current is controlled to be shaped to a sine wave in such a manner to be approximated to the input voltage. Accordingly, the current also reaches the maximum in the vicinity of the maximum value of voltage and the size of a boost reactor L1 is decided by this current, voltage and the switching frequency of the main switch Q1. For this reason, in order to miniaturize the boost reactor L1, the switching frequency in the vicinity of the maximum value of current must be increased. Moreover, a magnetic flux of the boost reactor L1 is proportional to the current. For this reason, the magnetic flux is maximum at the portion in the vicinity of the maximum value of current.

Figure 2:
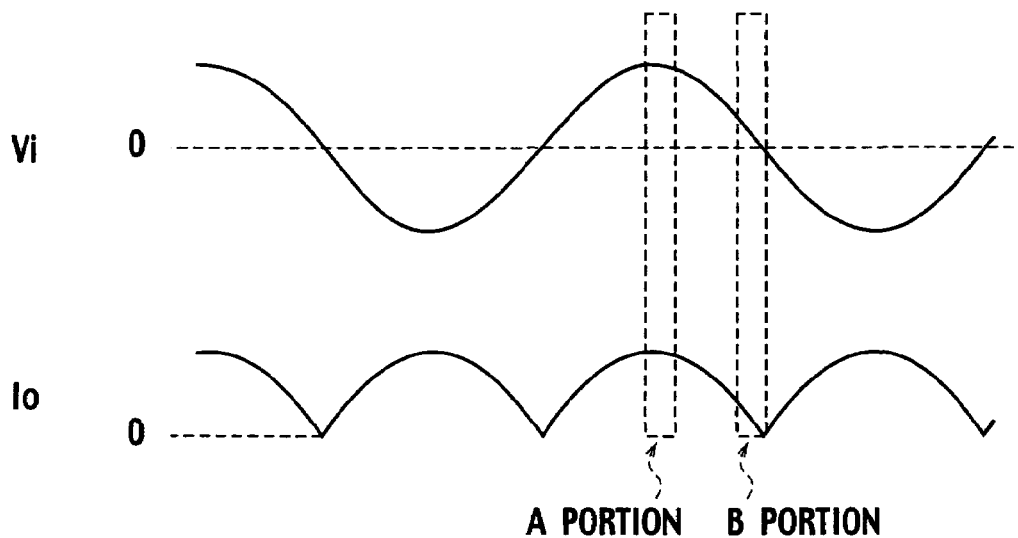
FIG. 2 is a timing chart of each of an AC power supply voltage waveform and a rectified output current waveform in the conventional power factor improving circuit.
Figure 3:
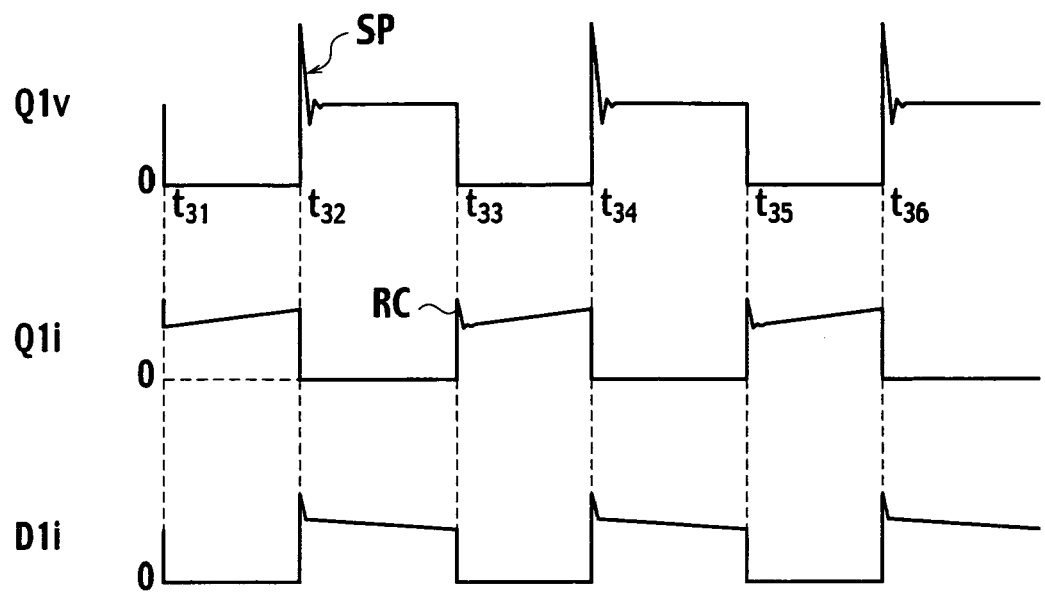
FIG. 3 is a view showing a switching waveform with a frequency of 100 kHz at a portion A of the timing chart shown in FIG. 2.
Figure 4:
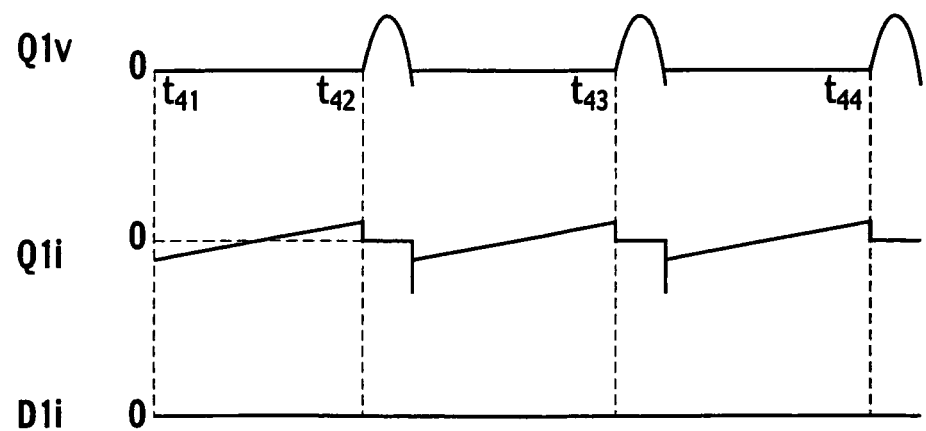
FIG. 4 is a view showing a switching waveform with a frequency of 100 kHz at a portion B of the timing chart shown in FIG. 2.

On the other hand, in the case of the conventional power factor improving circuit using a fixed switching frequency, at a portion (B) where an input voltage is low as shown in FIG. 2, voltage, which is obtained when the main switch Q1 is turned o ff, is shaped to a sine wave since energy stored in the boost reactor L1 is small due to an internal capacitance of the main switch Q1 as shown in FIG. 4. For this reason, the voltage is not increased up to an output voltage but is merely circulated in the interior, resulting in an increase in power loss. Accordingly, the power factor improving circuit of Embodiment 1 reduces the switching frequency of the main switch Q1 at a portion (portion B of FIG. 6) where the input current is low.

Figure 7:
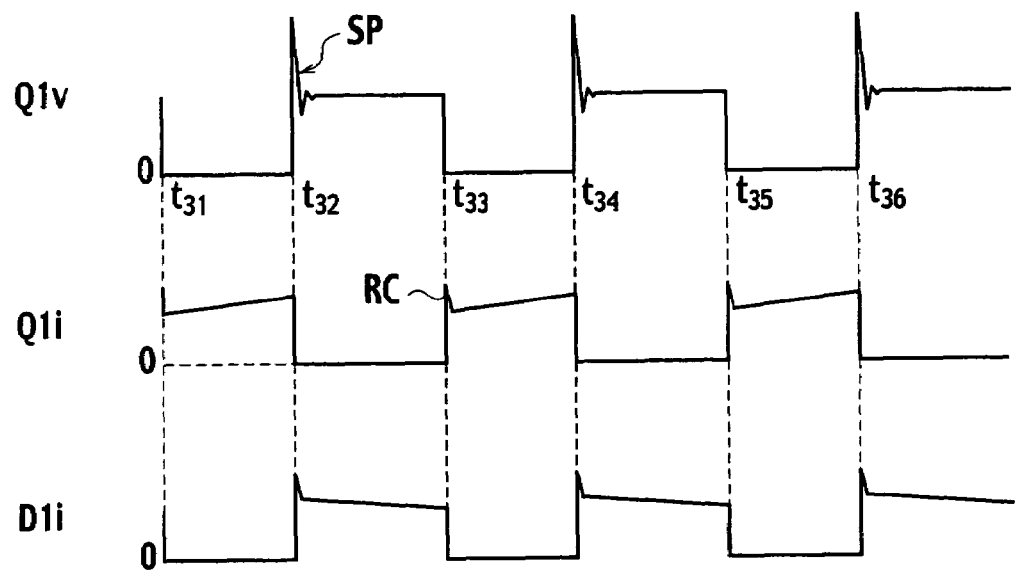
FIG. 7 is a view illustrating a switching waveform with a frequency of 100 kHz at a portion A of the timing chart shown in FIG. 6.
Figure 8:
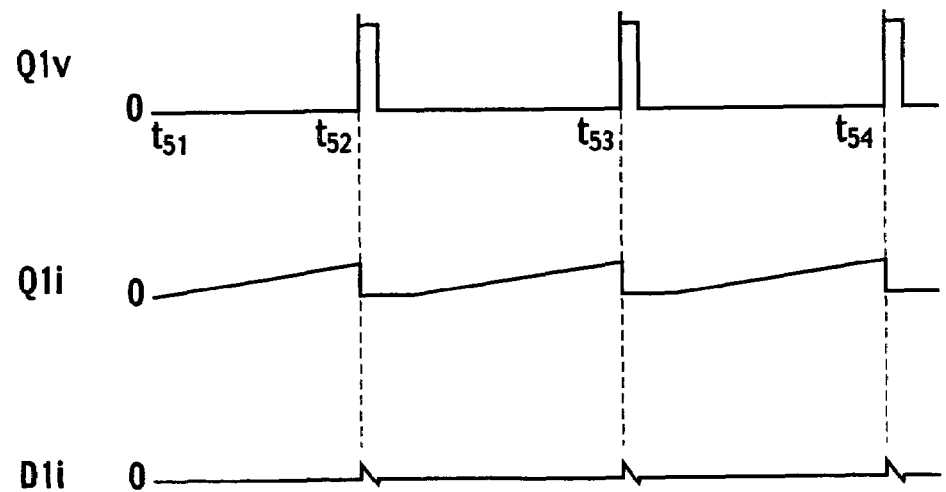
FIG. 8 is a view illustrating a switching waveform with a frequency of 20 kHz at a portion B of the timing chart shown in FIG. 6.

FIG. 7 illustrates a switching waveform with a frequency of 100 kHz at a portion A (vicinity where a value of an input current Ii is maximum) of the timing chart shown in FIG. 6. The timing chart shown in FIG. 7 is the same as the timing chart of FIG. 2 since the switching frequency f is 100 kHz. FIG. 8 illustrates a switching waveform with a frequency of 20 kHz at the portion B (portion where the input current Ii is low) of the timing chart shown in FIG. 6.

Figure 1:
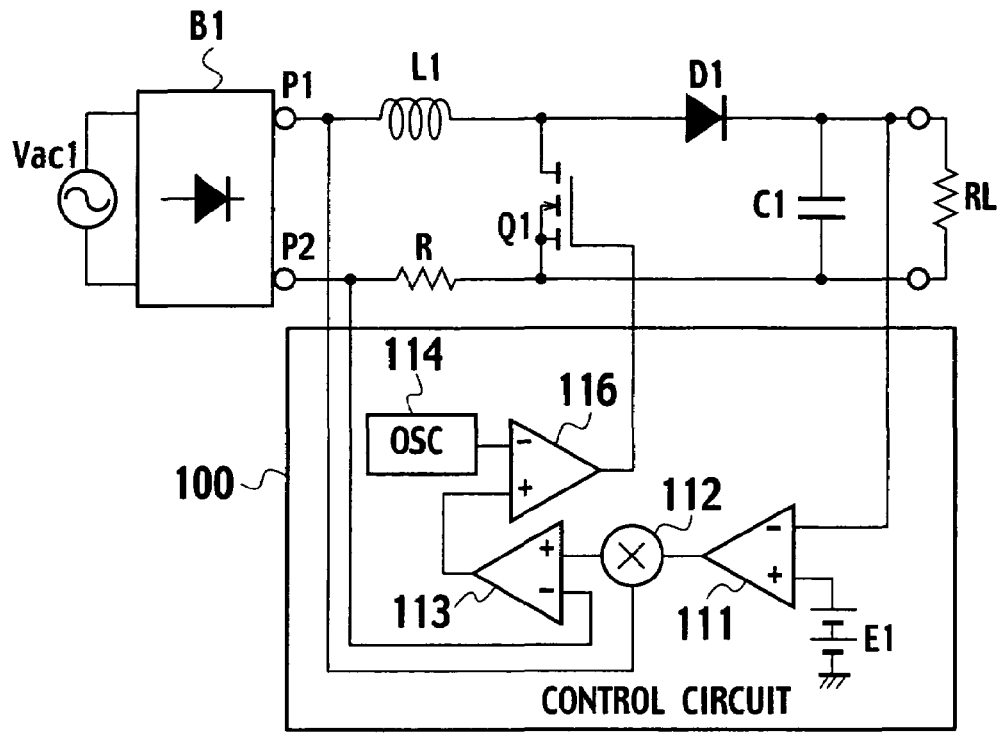
FIG. 1 is a circuit configuration diagram illustrating a conventional power factor improving circuit.

The power factor improving circuit of Embodiment 1 shown in FIG. 5 is different from the conventional power factor improving circuit shown FIG. 1 in only the structure of the control circuit 10. In addition, the other components shown in FIG. 5 similar to those corresponding components shown in FIG. 1 are assigned the same reference numerals and their detailed explanations are omitted.

The control circuit 10 includes an error amplifier 111, a voltage control oscillator (VCO) 115, and a PWM comparator 116. In addition, the error amplifier 111 and PWM comparator 116 are the same as those shown in FIG. 1 and their explanations are omitted.

The VCO 115 (corresponding to a frequency control section of the present invention) is connected to a junction of a negative-side output terminal P2 of a full-wave reflector B1 and a current sensing resistor R, and generates a triangular wave signal (corresponding to a frequency control signal of the present invention) obtained by changing the switching frequency f of the main switch Q1 according to a voltage value that is proportional to the current flowing into the current sensing resistor R. The VCO 115 has a voltage to frequency conversion characteristic in which the switching frequency f of the main switching Q1 is increased according to an increase in voltage detected by the current sensing resistor R.

Figure 9:
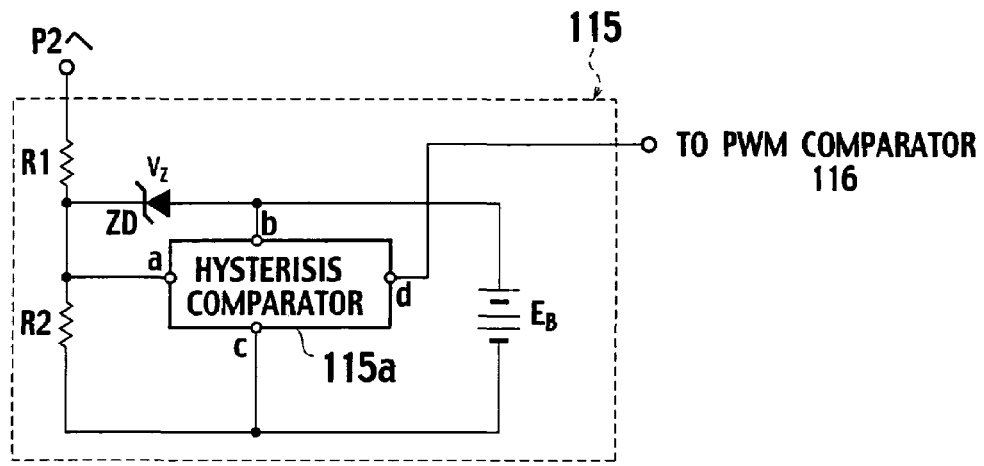
FIG. 9 is a specific circuit configuration diagram of VCO set in the power factor improving circuit according to Embodiment 1.

FIG. 9 is a specific circuit configuration diagram of VCO of the power factor improving circuit according to Embodiment 1. In VCO 115, a resistor R1 is connected to the current sensing resistor R and a resistor R2 is connected to the resistor R1 in series. A cathode of a Zener diode ZD is connected to a R1-R2 junction. An anode of the Zener diode ZD is connected to a positive pole of a control power supply $E_B$ and a power supply terminal b of a hysterisis comparator 115a. The R1-R2 junction is connected to an input terminal a of the hysterisis comparator 115a and a grounding terminal c of the hysterisis comparator 115a is connected to a negative pole of the control power supply $E_B$ and the other terminal of the resistor R2. An output terminal d of the hysterisis comparator 115a is connected to one terminal of the PWM comparator 116. The hysterisis comparator 115a generates a triangular wave signal having a voltage to frequency conversion characteristic CV in which the switching frequency f of the main switching Q1 is increased according to an increase in voltage Ea applied to the input terminal a as illustrated in FIG. 11.

With the VCO 115 shown in FIG. 9, when the input current Ii shown in FIG. 6 reaches the portion in the vicinity (portion A) of the maximum value, the voltage of the current sensing resistor R is increased, so that the Zener diode ZD breaks down. Accordingly, the voltage Ea applied to the input terminal a is set to a total voltage ($V_z+E_B$) of Zener diode ZD breakdown voltage $V_z$ and control power supply voltage $E_B$, namely, an upper setting voltage. Moreover, when the input current Ii reaches the portion (portion B) where the input current Ii is low, the voltage of current sensing resistor R is reduced, so that current flows into the resistor R2 from the control power supply $E_B$ through the Zener diode ZD. Accordingly, the voltage Ea applied to the input terminal a is set to a control power supply voltage $E_B$, namely, a lower limit setting voltage. Moreover, when the input current Ii is in the range including the vicinity of the maximum value and the low current portion, voltage Ea applied to the input terminal a is gradually changed in the range including the total voltage ($V_z+E_B$) and the control power supply voltage $E_B$.

Figure 11:
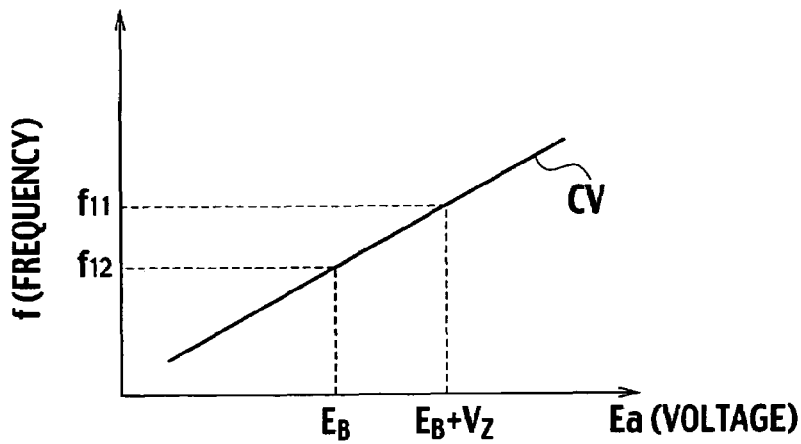
FIG. 11 is a view illustrating a characteristic of VCO of the power factor improving circuit according to Embodiment 1.

For this reason, as illustrated in FIG. 11, when the voltage, which is proportional to the input current Ii, is the lower limit setting voltage $E_B$ or less, the switching frequency f of the main switching Q1 is set to a lower limit frequency $f_{12}$ (for example, 20 kHz). When the voltage, which is proportional to the input current Ii, is the upper limit setting voltage ($Vz+E_B$) or more, the switching frequency f of the main switching Q1 is set to an upper limit frequency $f_{11}$ (for example, 100 kHz). When the voltage, which is proportional to the input current, ranges from the lower limit setting voltage $E_B$ to the upper limit setting voltage ($Vz+E_B$), the switching frequency f of the main switching Q1 is gradually changed from the lower limit frequency $f_{12}$ to the upper limit frequency $f_{11}$.

Figure 12:
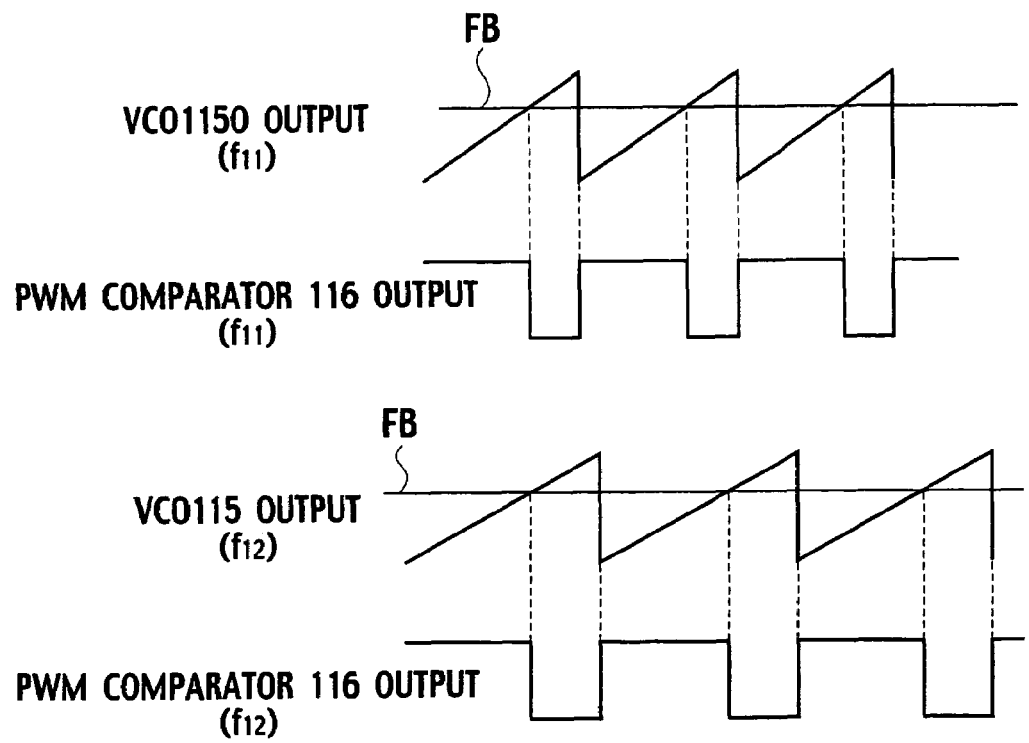
FIG. 12 is a view illustrating a state in which a pulse frequency of a PWM comparator is changed according to a change in a frequency of VCO of the power factor improving according to Embodiment 1.

In the PWM comparator 116 (corresponding to a pulse width control section of the present invention), a triangular wave signal is input to a terminal from the VCO 115 and a feedback signal FB is input to a +terminal from the error amplifier 111. The PWM comparator 116 generates a pulse signal that is turned on when a value of the feedback signal FB is a value of the triangular wave signal or more and that is turned off when the value of the feedback signal FB is below the value of the triangular wave signal as illustrated in FIG. 12. The PWM comparator 116 applies the pulse signal to the main switching Q1 to control an output voltage of a smoothing capacitor C1 to a predetermined voltage.

Moreover, the PWM comparator 116 controls the output voltage to a predetermined voltage by reducing a pulse-on width where the value of the feedback signal FB is the value of the triangular wave signal or more, when the output voltage of the smoothing capacitor C1 reaches a reference voltage E1 to reduce the feedback signal FB. In other words, the pulse width is controlled.

It is noted that the maximum and minimum values of the voltage of the triangular wave signal from the VCO 115 are not changed by the frequency. Accordingly, an on/off duty ratio of the pulse signal is decided by the feedback signal FB of the error amplifier 111 regardless of the frequency. Moreover, even if the switching frequency f is varied to change a pulse signal on-width, the on/off duty ratio of the pulse signal is unchanged An explanation will be next given of an operation of the above-structured power factor improving circuit of Embodiment 1 with reference to FIGS. 5 to 12. The following will explain only the operation of the control circuit 10.

First, the error amplifier 111 amplifies an error between the voltage of the smoothing capacitor C1 and the reference voltage E1 to generate an error voltage signal and output the error voltage signal as a feedback signal FB to the PWM comparator 116.

On the other hand, the VCO 115 generates a triangular wave signal obtained by changing the switching frequency f of the main switch Q1 according to a voltage value that is proportional to the value of current flowing into the current sensing resistor R.

Figure 10:
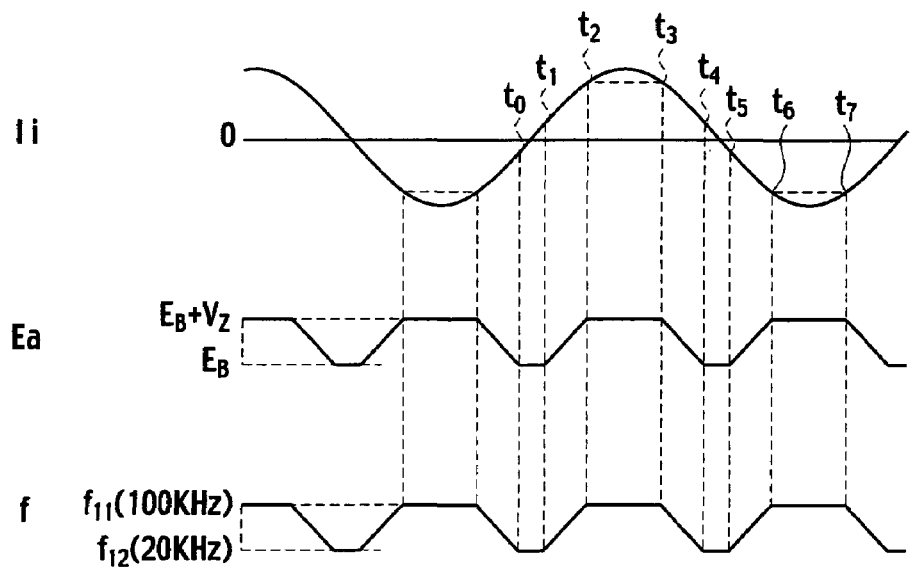
FIG. 10 is a timing chart illustrating each of an input current waveform, voltage input to a hysterisis comparator, and a switching frequency .that is changed by this voltage in the power factor improving circuit according to Embodiment 1.

The following will explain the operation with reference to the timing chart of FIG. 10. When the input current Ii reaches the portion in the vicinity of the maximum value (for example, time $t_2$-$t_3$ and time $t_6$-$t_7$), the Zener diode ZD shown in FIG. 9 breaks down. Accordingly, the voltage Ea applied to the input terminal a is set to a total voltage ($V_z$+$E_B$) of a Zener diode ZD breakdown voltage Vz and a control power supply voltage $E_B$, namely, an upper setting voltage. For this reason, when the voltage, which is proportional to the input current Ii, is the upper limit setting voltage (Vz+$E_B$) or more, the switching frequency f of the main switching Q1 is set to an upper limit frequency f1i (for example, 100 kHz) by the VCO 115.

Next, when the input current Ii reaches a low current portion (for example, time $t_{0-t1}$ and time $t_4$-$t_5$), the current flows into the resistor R2 from the control power supply $E_B$ shown in FIG. 9 through the Zener diode ZD. Accordingly, the voltage Ea applied to the input terminal a is set to a control power supply voltage $E_B$, namely, a lower limit setting voltage. For this reason, when the voltage, which is proportional to the input current Ii, is the lower limit setting voltage $E_B$ or less, the switching frequency f of the main switching Q1 is set to a lower limit frequency $f_{12}$ (for example, 20 kHz) by the hysterisis comparator 115a.

Moreover, when the input current Ii is in the range including the vicinity of the maximum value and the low current portion (for example, the time $t_1$-$t_2$, time $t_3$-$t_4$ and time $t_5$-$t_6$), voltage Ea applied to the input terminal a is gradually changed in the range including the total voltage ($V_z$+$E_B$) and control power supply voltage $E_B$. Accordingly, when the voltage, which is proportional to the input current Ii, ranges from the lower limit setting voltage $E_B$ to the upper limit setting voltage ($V_z$+$E_B$), the switching frequency f of the main switching Q1 is gradually changed from the lower limit frequency $f_{12}$ to the upper limit frequency $f_{11}$.

Next, when the input current Ii is in the vicinity of the maximum value (for example, the time $t_2$-$t_3$ and the time $t_6$-$t_7$), the PWM comparator 116 generates a pulse signal having an upper limit frequency $f_{11}$, which is turned on when a value of the feedback signal FB is a value of the triangular wave signal having an upper limit frequency $f_{11}$ or more and turned off when the value of the feedback signal FB is below the value of the triangular wave signal having the upper limit frequency $f_{11}$, and applies the pulse signal to the main switch Q1 as shown in FIG. 12.

On the other hand, at the portion where the input current Ii is low (for example, the time $t_0$-$t_1$ and the time $t_4$-$t_5$), the PWM comparator 116 generates a pulse signal having a lower limit frequency $f_{12}$, which is turned on when a value of the feedback signal FB is a value of the triangular wave signal having a lower limit frequency $f_{12}$ or more and turned off when the value of the feedback signal FB is below the value of the triangular wave signal having the lower limit frequency $f_{12}$, and applies the pulse signal to the main switch Q1 as shown in FIG. 12.

Moreover, when the input current Ii is in the range including the vicinity of the maximum value and the low current portion (for example, the time $t_1$-$t_2$ the time $t_3$-$t_4$ and the time $t_5$-$t_6$), the PWM comparator 116 generates a pulse signal having a frequency that is gradually changed in the range from the lower limit frequency $f_{12}$ to the upper limit frequency $f_{11}$, and applies the pulse signal to the main switch Q1.

As explained above, the power factor improving circuit of Embodiment 1 changes the switching frequency f of the main switch Q1 according to the input current Ii and reduces the switching frequency at the portion where the input current Ii is low. This increases the on-time of the main switch Q1 as shown in FIG. 8 and the current is also increased to allow power to be supplied to the load RL. Moreover, since the number of switching is reduced, switching loss can be also reduced.

Particularly, the upper limit frequency is set to, for example, 100 kHz as a switching frequency f of the main switch Q1 and the lower limit frequency is set to, for example, 20 kHz as a frequency that the human ear cannot hear, and the switching frequency f of the other portion is proportioned to the input current Ii. Accordingly, switching loss can be reduced and the frequency is lower than audio frequency, so that no uncomfortable noise is produced.

Furthermore, since the magnetic flux of boost reactor L1 is proportional to the current, the switching frequency is set to the maximum frequency when the input current reaches the maximum values. Even if the frequency of other portion is changed in proportional to the input AC power supply Vi, the magnetic flux of the boost reactor L1 does not exceed the maximum value. This allows a reduction in switching loss without enlarging the boost reactor L1.

Figure 16:
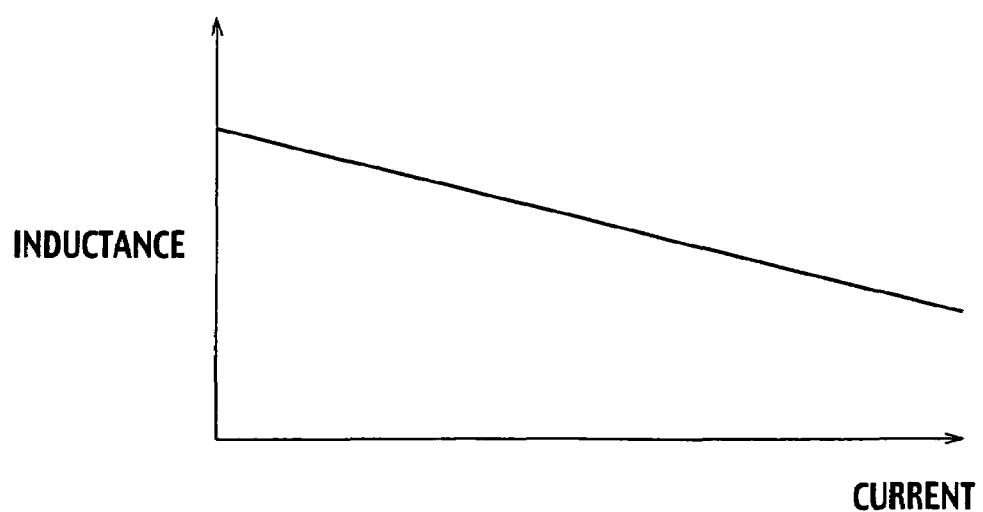
FIG. 16 is a view illustrating an inductance characteristic to current of a boost reactor.

Moreover, regarding an inductance characteristic to the current of the boost reactor L1, when the current is small, the inductance value may be increased, and when the current is large, the inductance value may be decreased as shown in FIG. 16. Energy stored in the boost reactor L1 is expressed by $(LI^2)/2$ and is proportional to an inductance value L and current I. For this reason, even when the current is small, energy stored in the boost reactor L1 is relatively large. Accordingly, since current continuous time of the boost reactor L1 can be increased to reduce an effective value of current, loss can be further decreased. Additionally, for example, ferrite powder and amorphous powder are mixed and their mixing ratio is appropriately selected, thereby making it possible to obtain a characteristic as illustrated in FIG. 16.

Furthermore, since the switching frequency f of the main switch Q1 ranges from the lower limit frequency to the upper limit frequency, generating noise is dispersed with respect to the frequency, so that noise can be reduced. Accordingly, it is possible to provide a power factor improving circuit that can achieve miniaturization, high efficiency and noise reduction.

This makes it possible to achieve miniaturization of a switching power supply device and an increase in efficiency thereof. Moreover, when power consumption is small such as standby time, the amount of input current is also decreased. When the main switch Q1 is switched at high frequency, a ratio of switching loss is increased to further reduce the efficiency. Accordingly, when the switching frequency is changed in proportional to the input current, the switching frequency is decreased at low output power to make it possible to reduce the switching loss. In other words, this makes it possible to improve the efficiency at the time of low output power (such as standby time) and reduce power consumption of equipment such as television (TV) sets. For example, it is possible to reduce power consumption at the time of low output power such as a function standby of, e.g., a digital TV set (a state in which a tuner and a part of the control circuit are operated to allow reception of a program guide).

Moreover, in the conventional power factor improving circuit shown in FIG. 1, the control circuit 100 for high pressure was needed since voltage was extracted from the positive-side output terminal P1 of the full-wave rectifier circuit B1. However, in the power factor improving circuit according to Embodiment 1, the control circuit 10 for low pressure may be used since voltage is derived from the negative-side output terminal P2 of the full-wave rectifier circuit B1.

EMBODIMENT 2

Figure 13:
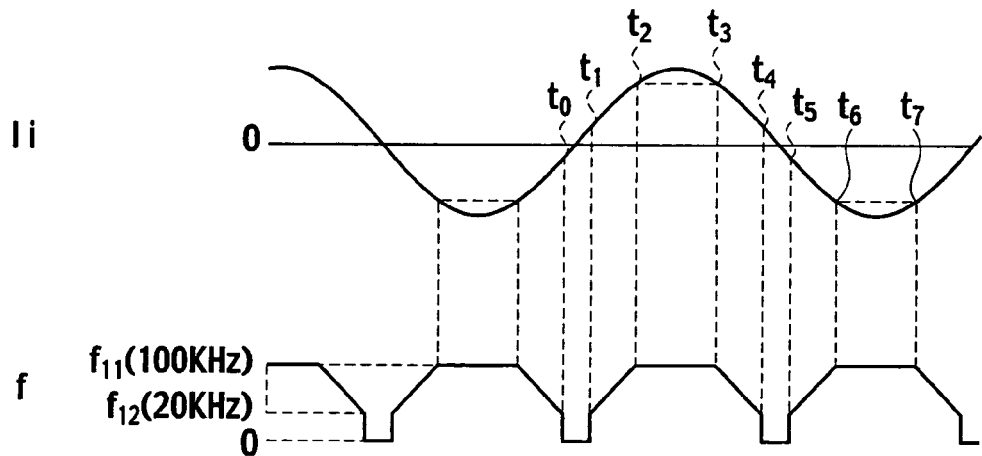
FIG. 13 is a timing chart illustrating each of an input current waveform and a switching frequency that is changed by voltage input to a hysterisis comparator in the power factor improving circuit according to Embodiment 2.

FIG. 13 is a timing chart of a switching frequency that is changed according to an input current waveform and voltage input to a VCO in a power factor improving circuit according to Embodiment 2.

In Embodiment 1 shown in FIG. 10, when the input current Ii reached the low current portion, the switching frequency f of the main switch Q1 was set to the lower limit frequency $f_{12}$ (for example, 20 kHz) by the VCO 115. In Embodiment 2 shown in FIG. 13, when the input current Ii is in the low current portion, the operation of the main switch Q1 is stopped by the VCO 115 in the case of the lower limit frequency $f_{12}$. At a portion where the operation is stopped, since the amount of the AC power supply current is small, distortion of the input current waveform is suppressed to a minimum.

EMBODIMENT 3

In Embodiment 3, when the voltage, which is proportional to the input current, is the setting voltage or less, the switching frequency of the main switch is set to the lower limit frequency (for example, 20 kHz), and when the voltage, which is proportional to the input current, exceeds the setting voltage, the switching frequency of the main switch is set to the upper limit frequency (for example, 100 kHz).

Figure 14:
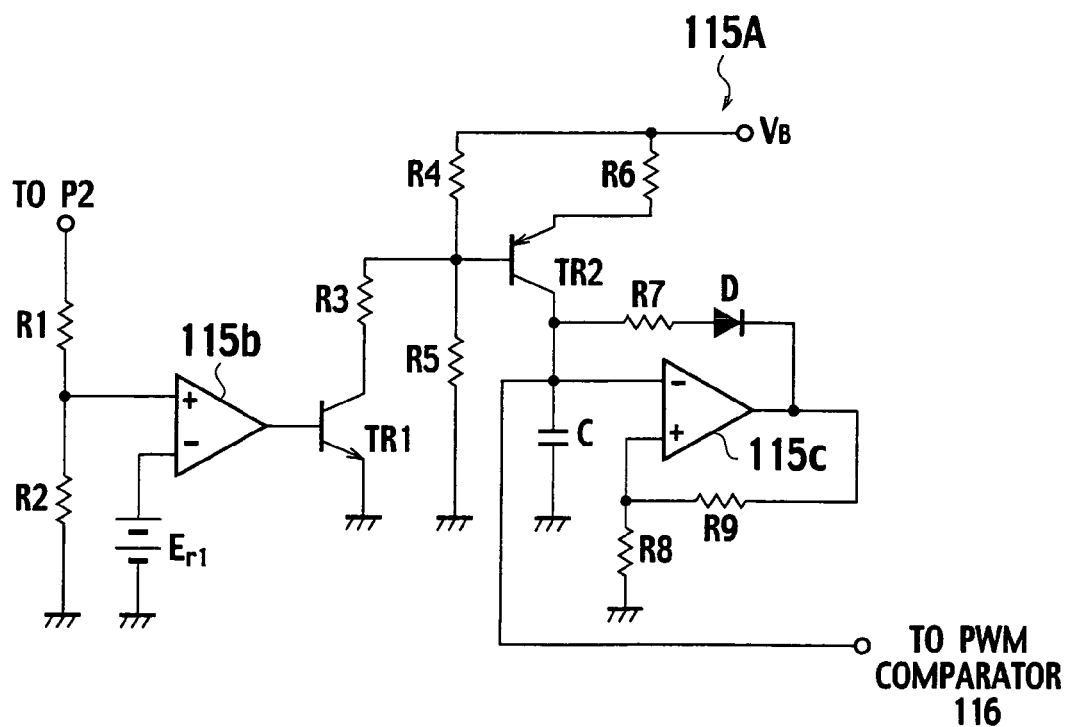
FIG. 14 is a specific circuit configuration diagram of VCO of a power factor improving circuit according to Embodiment 3.

FIG. 14 is a specific circuit configuration diagram of VCO of a power factor improving circuit according to Embodiment 3. In VCO 115 shown in FIG. 14, a resistor R1 is connected to a negative-side output terminal P2 of a full-wave rectifier circuit B1 and a resistor R2 is connected to the resistor R1 in series. A comparator 115b inputs voltage of a junction of the resistor RI and the resistor R2 to a +terminal and a reference voltage Er1 to a −terminal. The comparator 115b outputs an H-level voltage to a base of a transistor TR1 when the voltage at the junction of the resistor RI and the resistor R2 is higher than the reference voltage Er1. In this case, the reference voltage Er1 is set to the setting voltage.

An emitter of the transistor TR1 is grounded and a collector of the transistor TR1 is connected to a base of a transistor TR2, one end of a resistor R4 and one end of a resistor R5 through a resistor R3. The other end of the resistor R4 is connected to a power supply VB and the other end of the resistor R5 is grounded. An emitter of a transistor TR2 is connected to the power supply $V_B$ through a resistor R6 and a collector of the transistor TR2 is grounded through a capacitor C.

In order to provide hysterisis to a comparator 115c, a resistor R9 is connected between a +terminal and an output terminal, and the +terminal is grounded through a resistor R8.

Figure 15:
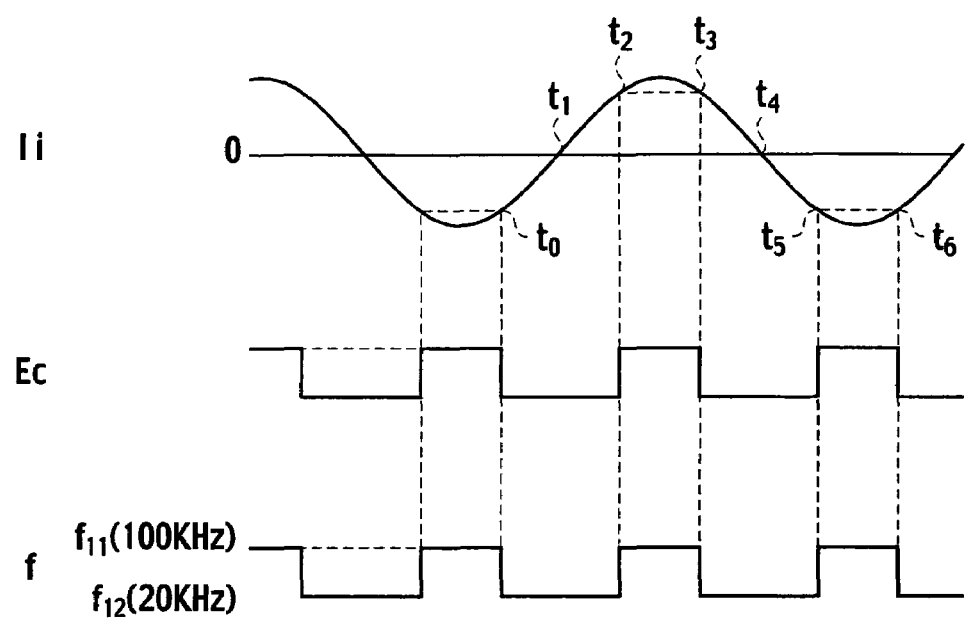
FIG. 15 is a timing chart illustrating each of an input current waveform, capacitor voltage, and a switching frequency that is changed by this voltage in the power factor improving circuit according to Embodiment 3.

The comparator 115c inputs the voltage of the capacitor C to the −terminal. Moreover, a series circuit having a diode D and a resistor R7 is connected to the −terminal from the output terminal in order to discharge the capacitor C. A VCO 115A generates a triangular wave signal obtained by setting the switching frequency f of the main switch Q1 to the lower limit frequency $f_{12}$ when the voltage, which is proportional to the input current Ii, is the setting voltage or less as shown in FIG. 15. The VCO 115A generates a triangular wave signal obtained by setting the switching frequency f of the main switch Q1 to the upper limit frequency $f_{11}$ when the voltage, which is proportional to the input current Ii, exceeds the setting voltage.

An explanation will be next given of an operation of the above-structured power factor improving circuit of Embodiment 3 with reference to FIGS. 14 and 15. The following will explain only the operation of the VCO 115A.

First, the VOC 115A generates a triangular wave signal obtained by changing the switching frequency f of the main switch Q1 according to the voltage value, which is proportional to the current flowing into the current sensing resistor R.

The following will explain the operation using a timing chart of FIG. 15. When the voltage, which is proportional to the input current Ii, exceeds the setting voltage (for example, the time $t_2$-$t_3$ and the time $t_5$-$t_6$), the transistor TR1 is turned on by the H-level voltage from the comparator 115b. Accordingly, since the current flows into the resistor R3 from the power supply VB through the resistor R4 and the base of the transistor TR2, a collector current of the transistor TR2 is increased. As a result, the capacitor C is charged by the current flowing into the collector of the transistor TR2 for a short period of time. In other words, since a voltage Ec of the capacitor C rises and the voltage Ec is input to the comparator 115c, the comparator 115c generates a triangular wave signal obtained by setting the switching frequency f of the main switch Q1 to the upper limit frequency $f_{11}$ (for example, 100 kHz).

On the other hand, when the voltage, which is proportional to the input current Ii, is the setting voltage or less (for example, the time $t_0$-$t_2$ and the time $t_3$-$t_5$), the transistor TR1 is turned off since the H-level voltage is not output from the comparator 115b. For this reason, the collector current of the transistor TR2 is reduced to increase charging time for the capacitor C. In other words, since the voltage Ec of the capacitor C slowly rises and the voltage Ec is input to the comparator 115c, the comparator 115c generates a triangular wave signal obtained by setting the switching frequency f of the main switch Q1 to the lower limit frequency $f_{12}$ (for example, 20 kHz).

Next, when the voltage, which is proportional to the input current Ii, exceeds the setting voltage (for example, the time $t_2$-$t_3$ and the time $t_5$-$t_6$), the PWM comparator 116 generates a pulse signal having an upper limit frequency $f_{11}$, which is turned on when a value of the feedback signal FB is a value of the triangular wave signal having an upper limit frequency $f_{11}$ or more and turned off when the value of the feedback signal FB is below the value of the triangular wave signal having the upper limit frequency $f_{11}$, and applies the pulse signal to the main switch Q1.

On the other hand, when the voltage, which is proportional to the input current Ii, is the setting voltage or less (for example, time $t_0$-$t_2$ and time $t_3$-$t_5$), the PWM comparator 116 generates a pulse signal having a lower limit frequency $f_{12}$, which is turned on when a value of the feedback signal FB is a value of the triangular wave signal having a lower limit frequency $f_{12}$ or more and turned off when the value of the feedback signal FB is below the value of the triangular wave signal having the lower limit frequency $f_{12}$, and applies the pulse signal to the main switch Q1.

As explained above, in the power factor improving circuit according to Embodiment 3, when the voltage, which is proportional to the input current Ii, is the setting voltage or less, the switching frequency of the main switch Q1 is set to the lower limit frequency, and when the voltage, which is proportional to the input current Ii, exceeds the setting voltage, the switching frequency of the main switch Q1 is set to the upper limit frequency. Accordingly, even in Embodiment 3, substantially the same effect as that of Embodiment 1 can be obtained.

Additionally, since the input current is small at the time of light load, the above can be applied to only the case when the voltage, which is proportional to the input current Ii, is the setting voltage or less, and the switching frequency f is set to only the lower limit frequency $f_{12}$ (for example 20 kHz).

EMBODIMENT 4

Figure 17:
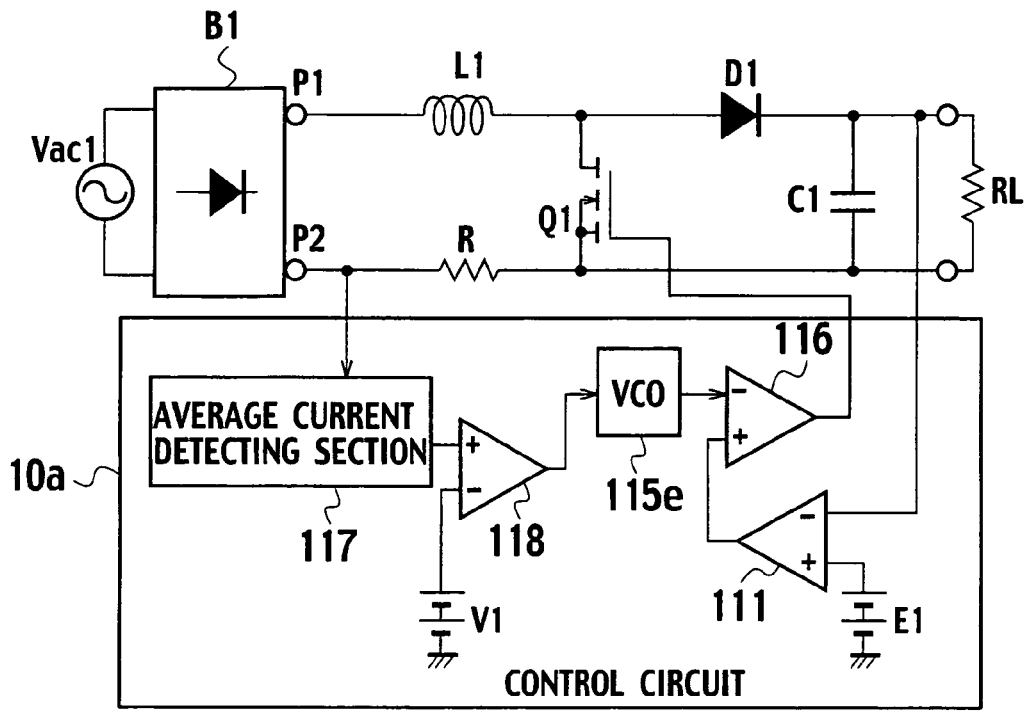
FIG. 17 is a circuit configuration diagram illustrating a power factor improving circuit according to Embodiment 4.

FIG. 17 is a circuit configuration diagram illustrating a power factor improving circuit according to Embodiment 4. In the power factor improving circuit of Embodiment 4 shown in FIG. 17, the main switch Q1 is operated at a low frequency (for example, 20 kHz) at the time of light load such as standby time and the main switch Q1 is operated at a high frequency (for example, 100 kHz) at a normal time (heavy load time). Since the structure of a control circuit 10a of Embodiment 4 is different from that of the control circuit 10 of Embodiment 1, explanation will be given to only the control circuit 10a.

The control circuit 10a includes an error amplifier 111, an average current detecting section 117, a comparator 118, a VCO 115e, and a PWM comparator 116.

The average current detecting section 117 detects an average value of current flowing into the current sensing resistor R. In the comparator 118, a reference voltage Vi is input to a −terminal and the average value of current from the average current detecting section 117 is input to a +terminal. The comparator 118 outputs an H-level voltage to the VCO 115e when the average value of current exceeds the reference voltage V1 and outputs an L-level voltage to the VCO 115e when the average value of current is the reference voltage V1 or less.

The VCO 115e generates a triangular wave signal obtained by setting the switching frequency of the main switch Q1 to 100 kHz when the H-level voltage is input from the comparator 118 and generates a triangular wave signal obtained by setting the switching frequency of the main switch Q1 is to 20 kHz when the L-level voltage is input from the comparator 118.

In the PWM comparator 116, the triangular wave signal from the VCO 115e is input to a −terminal and a feedback signal FB from the error amplifier 111 is input to a +terminal. The PWM comparator 116 generates a pulse signal, which is turned on when the value of feedback signal FB is the value of the triangular wave signal or more, and turned off when the value of feedback signal FB is below the value of the triangular wave signal. The PWM comparator 116 applies the pulse signal to the main switch Q1 to control an output voltage of a smoothing capacitor C1 to a predetermined voltage.

Figure 18:
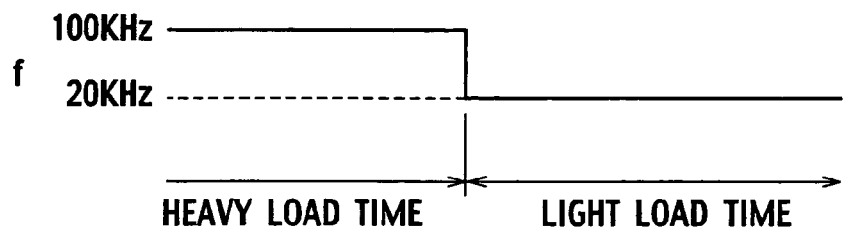
FIG. 18 is a view illustrating a state in which the switching frequency is reduced at the time of light load in the power factor improving circuit according to Embodiment 4.

According to the aforementioned structure, the VCO 115e generates a triangular wave signal obtained by setting the switching frequency of the main switch Q1 to 100 kHz when the average value of the current flowing into the current sensing resistor R exceeds the reference voltage V1. In this case, the switching frequency is set to 100 kHz at the time of heavy load as illustrated in FIG. 18. Also, the VCO 115e generates a triangular wave signal obtained by $f_{11}$ setting the switching frequency of the main switch Q1 to 20 kHz when the average value of the current exceeds the reference voltage V1 or less. In this case, the switching frequency is set to 20 kHz at the time of light load as illustrated in FIG. 18. In other words, the main switch Q1 can be operated at the low frequency (20 kHz) at the time of light load such as standby time and operated at the high frequency (100 kHz) at the normal time (heavy load time).

Moreover, in the apparatus such as TV set, a standby signal at the standby time is input from the television apparatus and the switching frequency of the main switch Q1 can be reduced by this standby signal. In this case, efficiency can be improved only at the standby time. Furthermore, the operation of the main switch Q1 is stopped by the standby signal and a DC/DC converter connected after the power factor improving circuit supplies power at the standby time, thereby making it possible to improve efficiency. Moreover, the switching frequency is reduced at the time of light load (standby time), so that switching loss can be reduced to make it possible to improve efficiency.

EMBODIMENT 5

Figure 19:
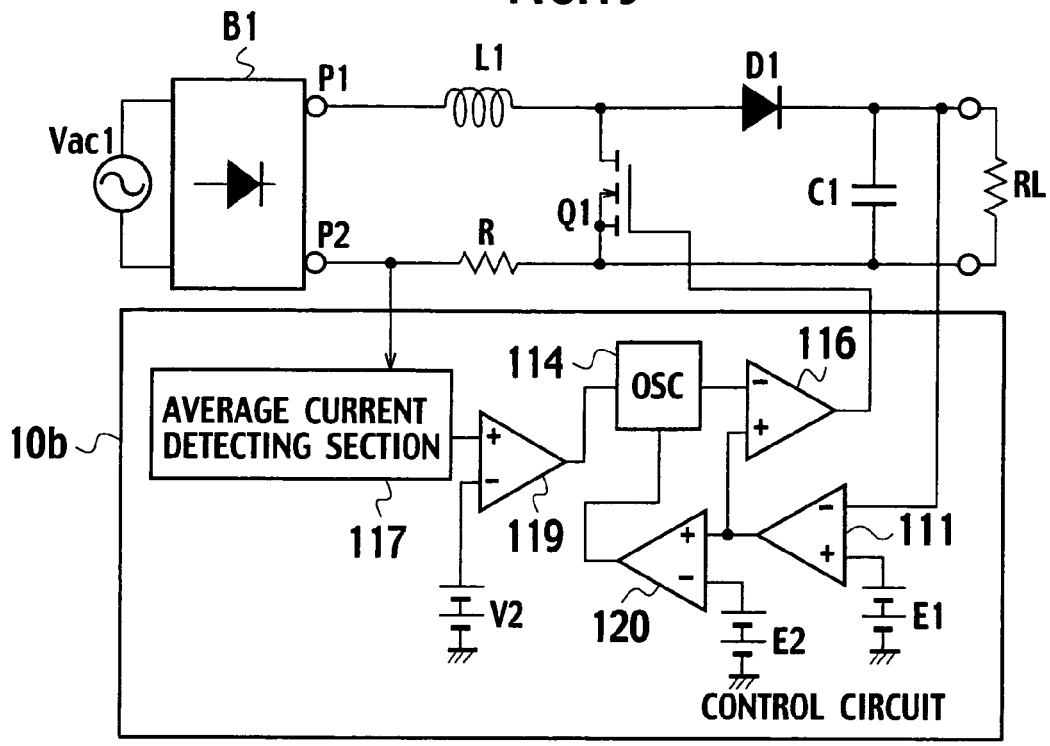
FIG. 19 is a circuit configuration diagram illustrating a power factor improving circuit according to Embodiment 5.

FIG. 19 is a circuit configuration diagram illustrating a power factor improving circuit according to Embodiment 5. The power factor improving circuit of Embodiment 5 shown in FIG. 19 stops the switching operation of the main switch Q1 when an average value of current flowing into the current sensing resistor R is the setting voltage value or less, and starts the switching operation of the main switch when an output voltage of a smoothing capacitor C1 is the setting value or less. Since only the structure of a control circuit 10b of Embodiment 5 is different from that of the control circuit 10 of Embodiment 1, explanation will be given to only the control circuit 10b.

The control circuit 10b includes an error amplifier 111, an average current detecting section 117, a comparator 119, an OSC 114, a comparator 120, and a PWM comparator 116.

The average current detecting section 117 detects an average value of current flowing into the current sensing resistor R. In the comparator 119, a reference voltage V2 is input to a −terminal and the average value of current from the average current detecting section 117 is input to a +terminal. The comparator 119 outputs an H-level voltage to the OSC 114 when the average value of current exceeds the reference voltage V2 and outputs an L-level voltage to the OSC 114 when the average value of current is the reference voltage V2 or less.

The OSC 114 generates a triangular wave signal obtained by setting the switching frequency of the main switch Q1 to 100 kHz when the H-level voltage is input from the comparator 119 and stops an oscillation operation of the triangular wave signal in order to stop the switching operation of the main switch Q1.

In the PWM comparator 116, the triangular wave signal from the OSC 114 is input to a −terminal and a feedback signal FB from the error amplifier 111 is input to a +terminal. The PWM comparator 116 generates a pulse signal, which is turned on when the value of feedback signal FB is the value of the triangular wave signal or more, and is turned off when the value of feedback signal FB is below the value of the triangular wave signal. The PWM comparator 116 applies the pulse signal to the main switch Q1 to control an output voltage of the smoothing capacitor C1 to a predetermined voltage.

In the comparator 120, a reference voltage E2 is input to a −terminal and a feedback signal FB from the error amplifier 111 is input to a +terminal. The comparator 120 outputs an H-level voltage to the OSC 114 when the value of the feedback signal FB is a value of the reference voltage E2 or more and outputs an L-level voltage to the OSC 114 when the value of the feedback signal FB is below the value of the reference voltage E2. Only when the H-level voltage is input from the comparator 120, the OSC 114 restarts the stopped oscillation operation of the triangular wave signal to generate a triangular wave signal obtained by setting the switching frequency of the main switch Q1 to 100 kHz.

According to the aforementioned structure, the OSC 114 generates a triangular wave signal obtained by setting the switching frequency of the main switch Q1 to 100 kHz when the average value of current flowing into the current sensing resistor R exceeds the reference voltage V2, and stops the oscillation operation of the triangular wave signal to stop the switching operation of the main switch Q1 when the average value of current is the reference voltage V2 or less. Moreover, only when the value of the feedback signal FB is the value of the reference voltage E2 or more (namely, the output voltage of smoothing capacitor C1 is the setting voltage or less), the OSC 114 restarts the stopped oscillation operation of the triangular wave signal to generate a triangular wave signal obtained by setting the switching frequency of the main switch Q1 to 100 kHz.

In other words, when the average value of the current flowing into the current sensing resistor R is the setting value or less, the switching operation of the main switch Q1 is stopped and when the output voltage of the smoothing capacitor C1 is the setting voltage or less, the switching operation of the main switch Q1 is started, so that switching loss of the main switching Q1 can be further reduced.

EMBODIMENT 6

Figure 20:
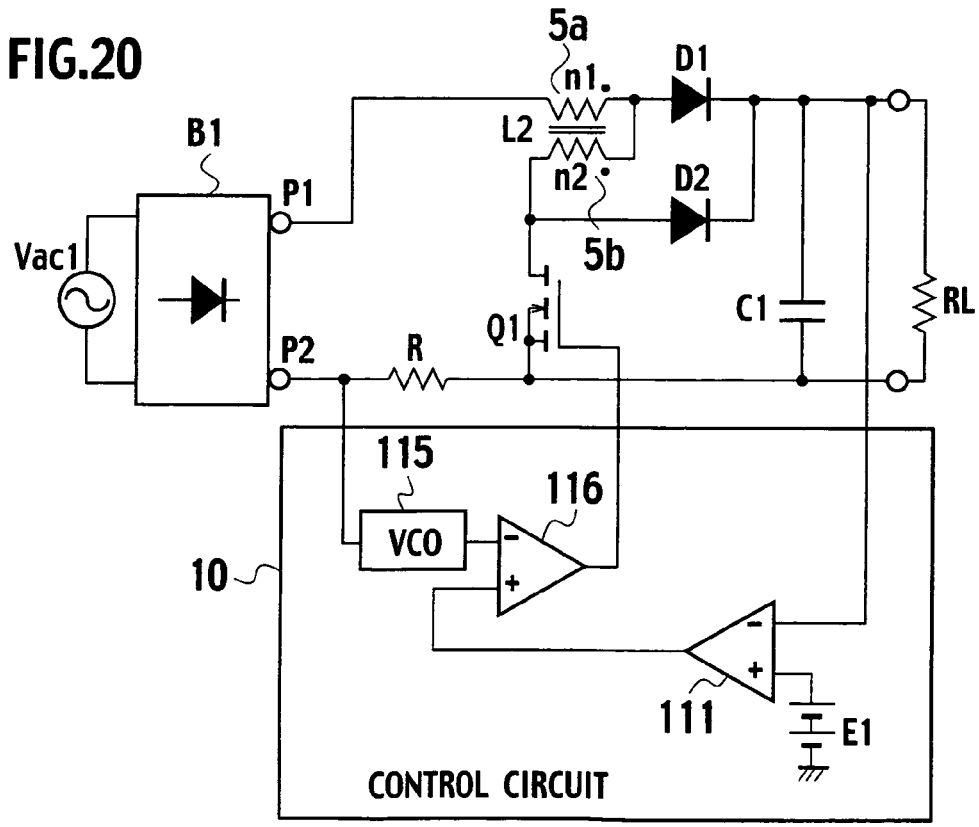
FIG. 20 is a circuit configuration diagram illustrating a power factor improving circuit according to Embodiment 6.

FIG. 20 is a circuit configuration diagram illustrating a power factor improving circuit according to Embodiment 6. In the power factor improving circuit according to Embodiment 6, the loss can be reduced by performing zero current switching (ZCS) by leakage inductance between a primary winding and a feedback winding, which are wound around a core having a central leg and a side leg, when the main switch is turned on. Moreover, the power factor improving circuit highly improves efficiency through a magnetic path of the core by feeding back energy stored in the leakage inductance to the load through the diode.

Furthermore, the power factor improving circuit is a continuous mode boost type power factor improving circuit in which an input current is shaped to a sine wave, voltage of the smoothing capacitor is controlled, and power is supplied to the load by the smoothing capacitor. The power factor improving circuit clamps the voltage of the main switching to the voltage of the smoothing capacitor. The continuous mode is an operation mode that turns on the main switch Q1 again when current D1$i$ flows into a diode D1, namely, current flows into a primary winding 5$a$.

In FIG. 20, a full-wave rectifier B1 is connected to an AC power supply Vac1, rectifies an AC power supply voltage from the AC power supply Vac1 to output the result to a positive-side output terminal P1 and a negative-side output terminal P2.

A boost reactor L2 has the primary winding 5$a$ (winding number n1) and a feedback winding 5$b$ (winding number n2) connected to the primary winding 5$a$ in series, and the primary winding 5$a$ and the feedback winding 5$b$ are electromagnetically coupled to each other. The feedback winding 5$b$ is loosely coupled to the primary winding 5$a$ and leakage inductance between the primary winding 5$a$ and the feedback winding 5$b$ is increased.

A first series circuit, which includes the primary winding 5$a$ of the boost reactor L2, the diode D1, the smoothing capacitor C1 and the current sensing resistor R, is connected between the positive-side output terminal P1 and the negative-side output terminal P2 of the full wave rectifier B1.

Moreover, a second series circuit, which includes the boost reactor L2, the main switch Q1 and the current sensing resistor R, is connected between the positive-side output terminal P1 and the negative-side output terminal P2 of the full wave rectifier B1. A diode D2 is connected between a junction of the main switch Q1 and the feedback winding 5$b$ and the smoothing capacitor C1.

The structure of the control circuit 10 is the same as that of FIG. 5, and the detailed explanations are omitted here.

The following will explain an operation of the above-structured power factor improving circuit according to Embodiment 6. First, since the current flows into the primary winding 5$a$, the diode D1 is in a conductive state. When the main switch Q1 is turned on, the current flows through the route of Vac1→B1→5$a$→5$b$→Q1→R→B1→Vac1 by voltage rectified by AC power supply voltage Vi. For this reason, a voltage is applied to leakage inductance Le (not shown) of the feedback winding 5$b$, so that current flowing into the main switch Q1 is increased by an inclination of Eo/Le. Accordingly, since the current of the main switch Q1 is started from zero, the main switch Q1 performs a ZCS operation.

Additionally, when the diode D1 is in a conductive state, the same voltage as an output voltage Eo (voltage across the smoothing capacitor C1) is applied to the leakage inductance Le. After the diode D1 is turned off, a voltage of the AC power supply Vac1 is applied to the primary winding 5$a$.

Furthermore, current flowing into the diode D1 is reduced to zero, simultaneously with an increase in current of the feedback winding 5$b$, and the diode D1 is turned off. During recovery time, a spike current due to recovery of the diode D1 flows into the main switch Q1. The spike current is limited by impedance of the leakage inductance Le.

When the recovery time is ended, the reverse direction of diode D1 is recovered, and a rate of increase in current of the feedback winding 5$b$ is reduced. The voltage of the primary winding 5$a$ of the boost reactor L2 is added to the input voltage and current Q1*i* flows through the route of Vac1→B1→15*a*→15*b*→Q1→R→B1→Vac1. The current of the main switch Q1 rises by an inclination of Vac1/5*a*.

Next, when the main switch Q1 is turned off, current flows into the diode D1 through the route of 5*a*→D1→C1→R→B1→Vac1→5*a* by energy stored in the primary winding 5*a* of the boost reactor L2. As a result, the smoothing capacitor C1 is charged and power is supplied to the load RL.

Likewise, a voltage of the main switch Q1 is increased by energy stored in the feedback winding 5*b*. Moreover, current flows into the diode D2 through the route of by 5*b*→D2→C1→R→B1→Vac1→5*a*→5*b* by energy stored in the feedback winding 5*b*. Namely, energy stored in the feedback winding 5*b* is regenerated by the load RL through the diode D2. An amount of energy at this time is decided by a voltage generated in the feedback winding 5*b* of the boost reactor L2 and current of the leakage inductance Le. The larger the number of windings n2 of the feedback windings 5*b*, the higher the generated voltage is, and its discharge is ended in a short period of time.

At the time when this discharge is completed, the current of diode D2 becomes zero. When the main switch Q1 is turned on again after a reverse characteristic is recovered, the ZCS operation can be continued. Moreover, the control circuit 10 controls the on-duty of the main switch Q1 in such a manner that the rectified output current waveform is shaped to be the same as the waveform obtained by full-wave rectifying the AC power supply voltage Vi, thereby making it possible to structure a boost type power factor improving circuit.

As mentioned above, according to the power factor improving circuit of Embodiment 6, when the main switch is turned on by the leakage inductance Le between the primary winding 5*a* and the feedback winding 5*b*, the spike current due to the diode recovery does not flow. For this reason, noise is reduced and a noise filter is miniaturized, thereby making it possible to miniaturize the switching power source and highly improve efficiency.

Moreover, since ZCS is carried out by the leakage inductance Le when the main switch Q1 is turned on, switching loss and switching noise can be reduced, thereby making it possible to highly improve efficiency and reduce noise. Moreover, energy stored in the leakage inductance Le is fed back to the load through the magnetic path of the core, thereby making it possible to highly improve the efficiency.

Furthermore, similar to Embodiment 1, the control circuit 10 sets the switching frequency of the main switch Q1 to the lower limit frequency (for example, 20 kHz) when the input current is the lower limit setting current or less, sets the switching frequency of the main switch Q1 to the upper limit frequency (for example, 100 kHz) when the input current is the upper limit setting current or more, and gradually changes the switching frequency of the main switch Q1 from the lower limit frequency to the upper limit frequency when the input current is in a range from the lower limit setting current to the upper limit setting current. As a result, the same effect as that of Embodiment 1 can be obtained. Additionally, the power factor improving circuit shown in FIG. 20 may be structured by the control circuit of Embodiment 2 having the characteristic as shown in FIG. 13, the control circuit of Embodiment 3 having the characteristic as shown in FIG. 15, the control circuit 10*a* of Embodiment 4 having the characteristic as shown in FIG. 17, or the control circuit 10*b* of Embodiment 5 having the characteristic as shown in FIG. 19, in place of the control circuit 10.

EMBODIMENT 7

Figure 21:
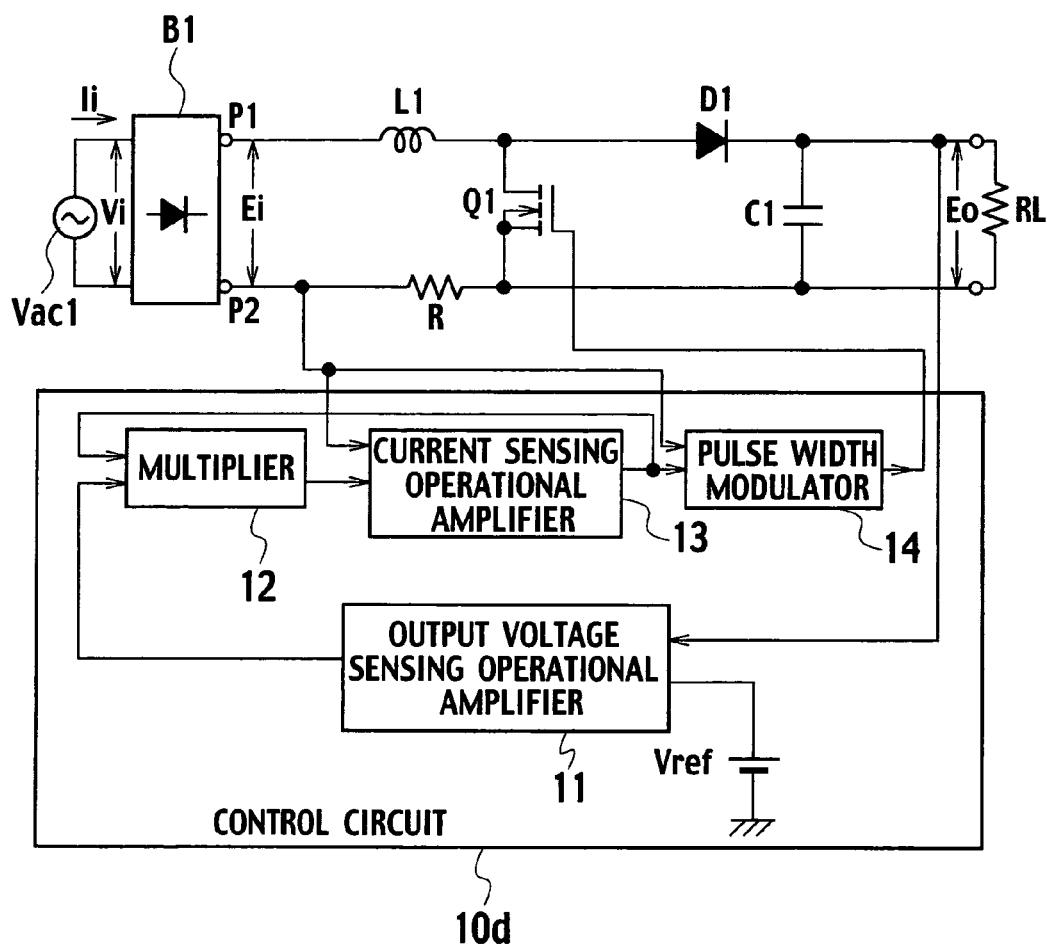
FIG. 21 is a circuit configuration diagram illustrating a power factor improving circuit according to Embodiment 7.

FIG. 21 is a circuit configuration diagram illustrating a power factor improving circuit according to Embodiment 7. Embodiment 7 is different from Embodiment 1 in the structure of a control circuit 10*d*. The control circuit 10*d* has an output voltage sensing operational amplifier 11, a multiplier 12, a current sensing operational amplifier 13, and a pulse width modulator 14. The output voltage sensing operational amplifier 11 corresponds to the error amplifier 111 of Embodiment 1 shown in FIG. 5.

The output voltage sensing operational amplifier 11 amplifies an error between voltage of the smoothing capacitor C1 and a reference voltage Vref, then generates an error voltage, and outputs the result to the multiplier 12. The multiplier 12 multiplies the error voltage from the output voltage sensing operational amplifier 11 and an output (input of the pulse width modulator 14) of the current sensing operational amplifier 13 and outputs a multiplied output voltage to the current sensing operational amplifier 13.

The current sensing operational amplifier 13 amplifies an error between a voltage, which is proportional to the input current detected by the current sensing resistor R, and the multiplied output voltage from the multiplier 12 to generate an error voltage and outputs the error voltage as a comparison input signal to the pulse width modulator 14. Moreover, as described above, the current sensing operational amplifier 13 feeds back the above-generated error voltage to the multiplier 12.

In addition, the power factor improving circuit of Embodiment 7 uses the multiplier 12 as a voltage varying section for varying the output of the current sensing operational amplifier 13 according to the error voltage from the output voltage sensing operational amplifier 11. In place of the multiplier 12, a divider or a variable gain amplifier can be used.

Figure 22:
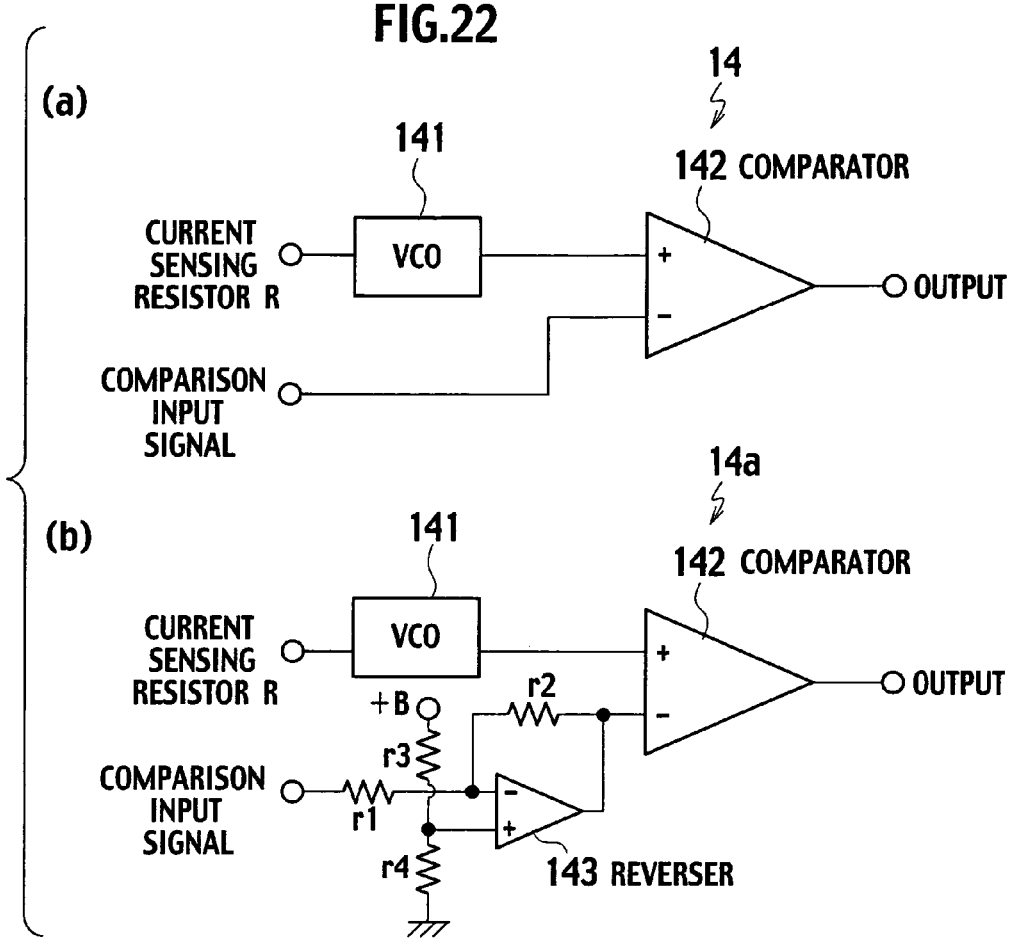
FIG. 22(*a*) is a configuration diagram illustrating a first example of a pulse width modulator included in a control circuit in the power factor improving circuit according to Embodiment 7.

The pulse width modulator 14 has a VCO 141 and a comparator 142 as illustrated in FIG. 22(*a*). The VCO 141 generates a triangular wave signal obtained by changing the switching frequency f of the main switch Q1 according to the voltage value which is proportional to the current flowing into the current sensing resistor R. In the comparator 142, the triangular wave signal from the VCO 141 is input to a +terminal and a comparison input signal from the current sensing operational amplifier 13 is input to a −terminal. The comparator 142 generates a pulse signal, which is turned on, for example, (H level) when the value of triangular wave signal is the value of comparison input signal or more, and turned off, for example, (L level, e.g., zero) when the value of triangular wave signal is below the value of the comparison input signal. The comparator 142 applies the pulse signal to the gate of the main switch Q1 to control the output voltage of the smoothing capacitor C1 to a predetermined voltage. The VCO 141 corresponds to the VCO 115 of Embodiment 1 shown in FIG. 5. The comparator 142 corresponds to the PWM comparator 116 of Embodiment 1 shown in FIG. 5.

Figure 24:
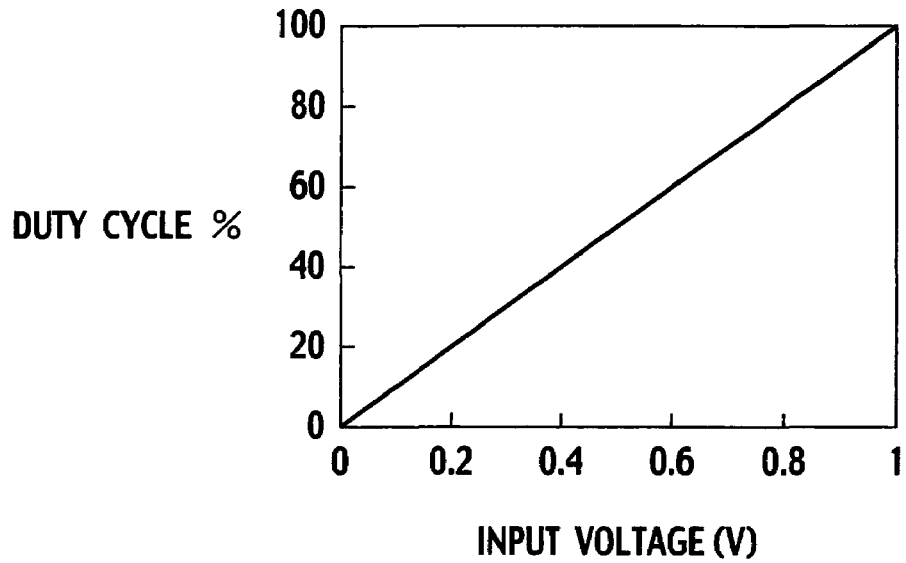
FIG. 24(*a*) is a view illustrating a first example of an I/O characteristic of the pulse width modulator.
Figure 24:
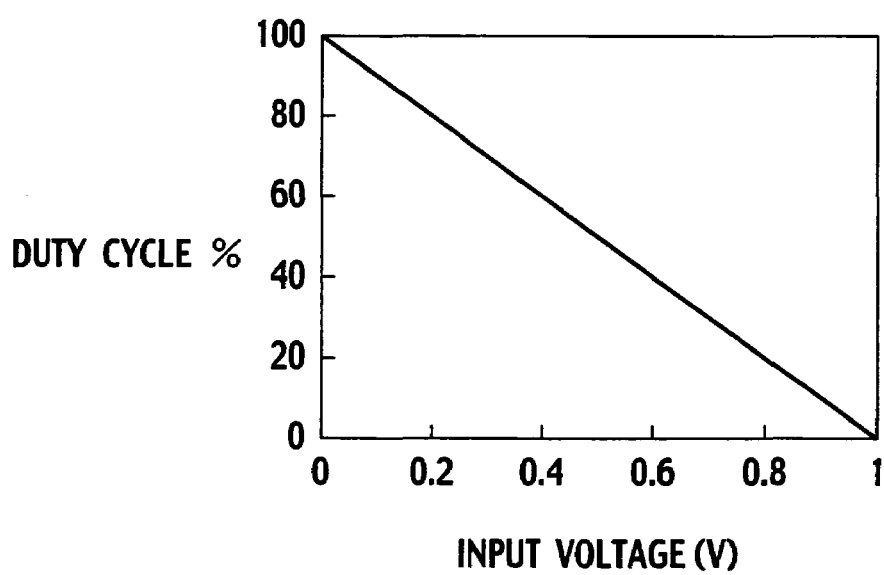

FIGS. 24(*a*) and 24(*b*) are views each illustrating an example of an I/O characteristic of a pulse width modulator. FIG. 24(*a*) shows an I/O characteristic of the pulse width modulator in which an input voltage Es and a duty cycle D are in proportional to each other, namely the relationship of Es=D is established. FIG. 24(*b*) shows an I/O characteristic of the pulse width modulator in which the relationship of Es =1-D is established between the input voltage Es and the duty cycle D.

Figure 23:
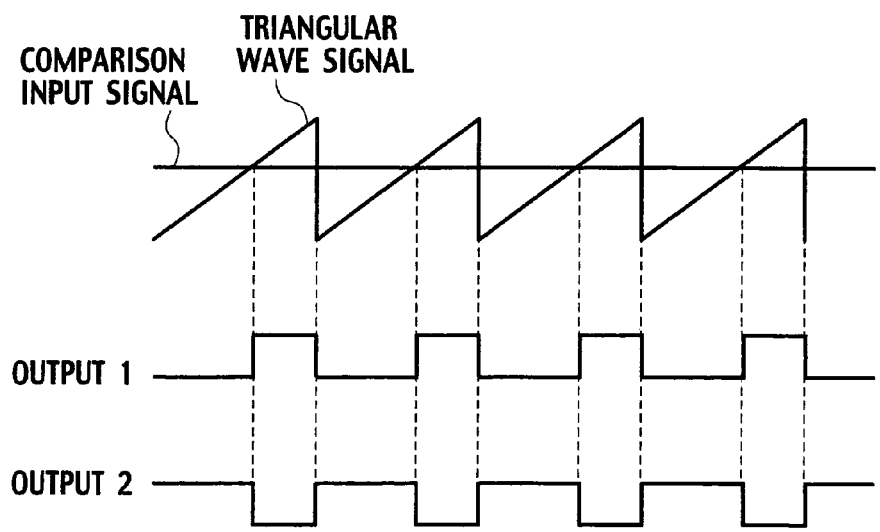
FIG. 23 is a view illustrating an I/O waveform of the pulse width modulator.

In the pulse width modulator 14 shown in FIG. 22(*a*), a waveform as shown by "output 1" in FIG. 23 is obtained as an I/O waveform, and a characteristic as shown in FIG. 24(*a*) is obtained as an I/O characteristic of the pulse width modulator 14.

Also, the comparator 142 generates a pulse signal, which is turned on, for example, when the value of comparison input signal is the value of triangular wave signal or more, and turned off, for example, when the value of comparison input signal is below the value of triangular wave signal. The comparator 142 may apply the pulse signal to the gate of the main switch Q1 to control the output voltage of the smoothing capacitor C1 to a predetermined voltage. In other words, when "+" and "−" input terminals of the comparator 142 are inversely connected as shown in FIG. 22(*a*), the output voltage is reversed. A waveform as shown by "output 2" in FIG. 23 is obtained as an I/0 waveform, and a characteristic as shown in FIG. 24(*b*) is obtained as an I/O characteristic.

FIG. 22(*b*) shows another structure example of a pulse width modulator 14*a*. After the comparison input signal is reversed by a reverser 143 having an operational amplifier and the pulse width modulator 14*a* supplies the reversed comparison input signal to a −terminal of the comparison 142. The reverser 143 connects a resistor r2 between an output terminal and the−terminal, inputs the comparison input signal to the−terminal through a resistor r1, inputs voltage divided by a resistor R3 and a resistor r4 to a +terminal, and outputs a reversed output to the−terminal of the comparator 142.

According to the aforementioned structure, when a voltage of the comparison input signal is low, a voltage at the−terminal of the comparator 142 is high. As a result, the I/O characteristic of the pulse width modulator 14*a* is shown as in FIG. 24(*b*), and the duty cycle D becomes small. When "+" and "−" input terminals of the comparator 142 are inversely connected as shown in FIG. 22(*b*) and the voltage of the comparison input signal is high, a voltage at the−terminal of the comparator 142 becomes low. As a result, the I/O characteristic of the pulse width modulator 14 is shown as in FIG. 24(*a*), and the duty cycle D is increased at a low voltage of comparison input signal.

An explanation will be next given of an operational principle of the power factor improving circuit according to Embodiment 7. An operation of a control circuit 10*d* is explained here.

First, it is assumed that current of the boost reactor LI continuously flows. If the duty cycle (corresponding to on-time ratio T2/T1 where a switching period of the main switch Q1 is T1 and on-time of the main switch Q1 is T2), in which the main switch Q1 is turned on, is D, the relationship between an input voltage Ei, which is a voltage across the full-wave rectifier B1, and an output voltage Eo, which is a voltage across the load RL, is Eo/Ei=1/(1−D).

Moreover, it is assumed that the characteristic of the pulse width modulator 14 is one as shown in FIG. 23. If the input voltage of the pulse width modulator 14 is Es, Es=1−D is established, and therefore, Es=1−D=Ei/Eo is established.

The output voltage Eo is DC and its value is substantially constant, and the input voltage Ei is a sine wave with a half cycle. For this reason, the input voltage Es is an amplified output of the current sensing operational amplifier 13 and is shaped to a sine wave with a half cycle. The multiplier 12 varies the output of the current sensing operational amplifier 13 according to the value of the error voltage (DC voltage) from the output voltage sensing amplifier 11 and outputs the obtained voltage, serving as a second reference voltage (reference voltage with a half- sine wave), to the current sensing operational amplifier 13. The current sensing operational amplifier 13 amplifies an error between a voltage Vrsh, which is proportional to the current detected by the current sensing resistor R, and a reference voltage with a half-sine wave, and outputs the half-sine wave to the pulse width modulator 14. For this reason, the input current detected by the current sensing resistor R is shaped to a half-sine wave. Accordingly, the input current flowing into the current sensing resistor R is shaped to the half-sine wave in proportional to the input voltage Ei, thereby allowing improvement in the power factor.

Moreover, since the output voltage from the output voltage sensing operational amplifier 11 is input to the other input terminal of the multiplier 12, the multiplier 12 varies a gain (output) according to the value of the output voltage from the output voltage sensing operational amplifier 11. This makes it possible to change magnitude in the voltage with the half-sine wave to be input to the pulse width modulator 14.

If the output voltage Eo is decreased by some reason, the output voltage sensing operational amplifier 11 reduces the output voltage according to the decrease in the output voltage Eo. Then, since the multiplier 12 reduces the gain (output) based on the decrease in the output voltage of the output voltage sensing operational amplifier 11, the comparison input signal output from the current sensing operational amplifier 13 is also reduced and the pulse width modulator 14 increases the average duty cycle D of the pulse signal based on the decrease in the comparison input signal from the current sensing operational amplifier 13 (case of output 1 shown in FIG. 23). As a result, a ratio of time during which the main switch Q1 is in an on state is increased, and thus the input current is also increased. Accordingly, the output voltage Eo rises, so that the output voltage Eo is maintained constant.

Next, an entire operation of the power factor improving circuit will be explained with reference to the waveform of each section of FIG. 25. First, when an input voltage Vi with a sine wave from the AC power supply Vac1 is input, an input current Ii with a sine wave flows. Then, the input voltage Vi from the AC power supply Vac1 is rectified by the full-wave rectifier Bi, so that a full-wave rectified voltage Ei is output.

When the main switch Q1 is turned on, current flows through the route of B1→L1→Q1→R→B1. Next, when the main switch Q1 is changed from on to off, the voltage of the main switch Q1 is increased by a voltage induced by the boost reactor L1. Moreover, since the main switch Q1 is turned off, the current flowing into the main switch Q1 becomes zero. Furthermore, the current flows through the route of L1→D1→C1 to supply power to the load RL.

As explained above, the main switch Q1 is turned on/off at the switching frequency, and therefore, the sine wave current with a half cycle flows across the current sensing resistor R. Then, a voltage (sine wave voltage with a negative half cycle shown by "multiplier input 2" in FIG. 25) is input to one end of the multiplier 12 from the current sensing operational amplifier 13. Moreover, a voltage (positive DC voltage shown by "multiplier input 1" in FIG. 25) is input to the other end of the multiplier 12 from the output voltage sensing operational amplifier 11. The multiplier 12 varies the output of the current sensing operational amplifier 13 according to the value of the error voltage (DC voltage) from the output voltage sensing operational amplifier 11. The varied voltage serves as a reference voltage with a half-sine wave.

Then, the current sensing operational amplifier 13 amplifies an error between the voltage Vrsh, which is proportional to the current detected by the current sensing resistor R, and a reference voltage with a half-sine wave, and outputs the half-sine wave to the pulse width modulator 14. As illustrated in FIG. 25, a "current sensing operational amplifier output" is output as an output voltage with a half cycle-sine wave having a similar figure to its input.

Figure 25:
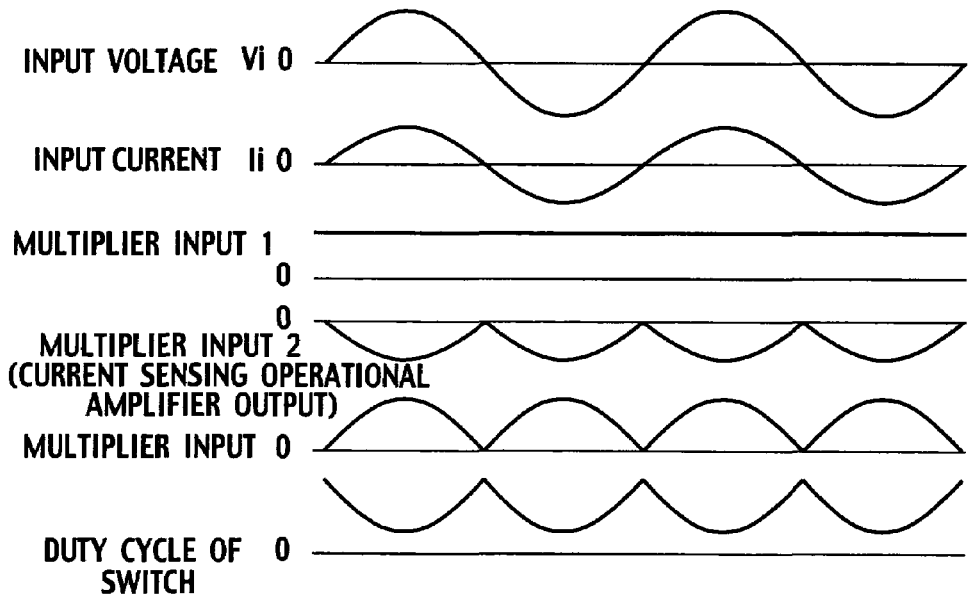
FIG. 25 is a view illustrating a waveform of each section of the power factor improving circuit according to Embodiment 7.
Figure 26:
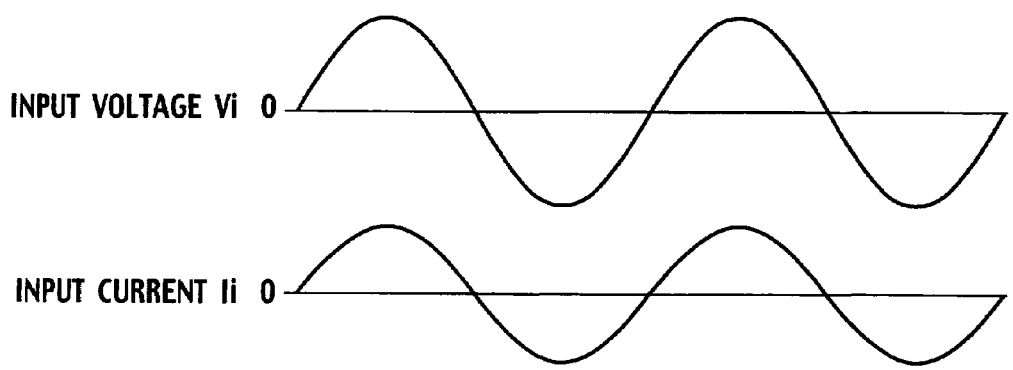
FIG. 26 is a view illustrating a waveform of each of an input voltage and an input current of the power factor improving circuit according to Embodiment 7.

Next, the "current sensing operational amplifier output" as shown in FIG. 25 is input to the pulse width modulator 14 to control the pulse width of the pulse signal. At this time, since the pulse width modulator 14 has the characteristic as shown in FIG. 24(b), the duty cycle of the main switch Q1 as shown in FIG. 25 is obtained. FIG. 26 shows an actual input voltage Vi and an input current Ii of this power factor improving circuit. The waveforms illustrated in FIG. 26 are extremely close to the sine wave, and shows a good result of each of the power factor and distortion factor although they slightly deviates from the sine wave in the vicinity of zero current.

As mentioned above, the power factor improving circuit of Embodiment 7 can improve the power factor and input the output of the current sensing operational amplifier 13 to the multiplier 12. Accordingly, there is no need to provide a resistor for dividing the full-wave rectified voltage output from the positive-side output terminal P1 of the full-wave rectifier B1, thereby making it possible to reduce the number of parts for the control circuit 100 shown in FIG. 1 to achieve a simple structure and facilitate adjustment of the circuit with low cost.

Additionally, the conventional power factor improving circuit shown in FIG. 1 has a first negative feedback loop in which current is detected by the current sensing resistor R to PWM control the main switch Q1 through the current sensing operational amplifier 13 and the pulse width modulator 14, thereby controlling the current. Also, the conventional power factor improving circuit has a second negative feedback loop in which the output voltage of smoothing capacitor C is detected to control the main switch Q1 through the output voltage sensing operational amplifier 11, the multiplier 12, the current sensing operational amplifier 13 and the pulse width modulator 14, thereby controlling the output voltage. Furthermore, the conventional power factor improving circuit has a third negative feedback loop in which a voltage from the full-wave rectifier B1 is detected to control the main switch Q1 through the multiplier 12 and the pulse width modulator 14, thereby controlling the output voltage.

In contrast to the above, the power factor improving circuit of Embodiment 7 can reduce one voltage detection loop in which the voltage from the full-wave rectifier B1 is detected and the result is input to the multiplier 12. This eliminates the instability of the control circuit 10d caused by this loop, and the circuit can be stably controlled in the two loops.

Moreover, the switching frequency of the main switching Q1 is set to the lower limit frequency (for example 20 kHz) by the VCO 141 in the pulse width modulator 14 included. in the control circuit 10d when the input current is the lower limit setting current or less as in Embodiment 1. When the input current is the upper limit setting current or more, the switching frequency of the main switching Q1 is set to the upper limit frequency (for example 100 kHz). When the input current is in a range from the lower limit setting current to the upper limit setting current, the switching frequency of the main switching Q1 is gradually changed from the lower limit frequency to the upper limit frequency. This leads to the same effect as that of Embodiment 1. Moreover, this power factor improving circuit may be structured by the control circuit of any one of Embodiments 2 to 5, in place of the control circuit 10d.

As explained above, in the power factor improving circuit of the present invention, the switching frequency of the main switch is changed according to the value of current flowing into the AC power supply, or that of current flowing into a rectifier, or that of current flowing into the main switch, namely, the value of input current, thereby reducing the switching frequency or stopping the switching operation at the portion where the input current is low. Accordingly, it is possible to decrease power loss of the portion where the input current is low and achieve miniaturization, high efficiency, and noise reduction. This makes it possible to achieve miniaturization of a switching power supply device and an increase in efficiency thereof and improve efficiency at a low output power (such as standby time) to reduce power consumption of equipment such as television (TV) sets.

Additionally, the power factor improving circuit shown in FIG. 20 may be structured by the control circuit 10d of Embodiment 7 shown in FIG. 21, in place of the control circuit 10.

INDUSTRIAL APPLICABILITY

The power factor improving circuit of the present invention can be applied to an AC-DC conversion type power supply circuit.

The invention claimed is:

1. A power factor improving circuit comprising:
   a boost reactor which inputs a rectified voltage obtained by rectifying an AC power supply voltage of an AC power supply by a rectifier circuit;
   a main switch which inputs the rectified voltage through the boost reactor and is turned on/off;
   a converting section which converts a voltage, which is obtained when the main switch is turned on/off, into a DC output voltage; and
   a control section which controls turn-on/off of the main switch to shape an AC power supply current to sine wave form, controls the DC output voltage of the converting section to a predetermined voltage, and controls a switching frequency of the main switch and a switching duty cycle of the main switch according to a momentary value of current wave form of current flowing into the AC power supply or that of current flowing into the rectifier circuit or that of current flowing into the main switch.

2. A power factor improving circuit comprising:
   a boost reactor which has a primary winding and a feed back winding connected to the primary winding in series and coupled to the primary winding and includes a leakage inductance more than a predetermined inductance value;
   a first series circuit which is connected between one output terminal of a rectifier circuit which rectifies an AC power supply voltage of an AC power supply and another output terminal thereof, and includes the primary winding of the boost reactor, a first diode, and a smoothing capacitor;
   a second series circuit which is connected between the one output terminal of the rectifier circuit and another output terminal thereof, and includes the primary winding of the boost reactor, the feedback winding, and a main switch;
   a second diode which is connected between a junction of the main switch and the feedback winding and the smoothing capacitor; and
   a control section which controls turn-on/off of the main switch to shape an AC power supply current to a sine wave, controls an output voltage of the smoothing capacitor to a predetermined voltage, and controls a switching frequency of the main switch and a switching duty cycle of the main switch according to a momentary value of current wave form of current flowing into the AC power supply or that of current flowing into the rectifier circuit, or that of current flowing into the main switch.

3. The power factor improving circuit according to claim 1, wherein the control section comprises:
an error voltage generating section which amplifies an error between the output voltage and a reference voltage to generate an error voltage signal;
a current detecting section which detects the current flowing into the AC power supply, the current flowing into the rectifier circuit, or the current flowing into the main switch;
a frequency control section which generates a frequency control signal obtained by changing the switching frequency of the main switch according to the value of the current detected by the current detecting section; and
a pulse width control section which controls a pulse width based on the error voltage signal of the error voltage generating section and generates a pulse signal obtained by changing the switching frequency of the main switch according to the frequency control signal generated by the frequency control section, and applies the pulse signal to the main switch to control the output voltage to a predetermined voltage.

4. The power factor improving circuit according to claim 1, wherein the control section sets the switching frequency of the main switch to a lower limit frequency when the current flowing into the AC power supply, the current flowing into the rectifier circuit, or the current flowing into the main switch is a lower limit setting current or less, the control section sets the switching frequency to an upper limit frequency when the current is an upper limit current or more, and the control section gradually changes the switching frequency from the lower limit frequency to the upper limit frequency when the current ranges from the lower limit setting current to the upper limit setting current.

5. The power factor improving circuit according to claim 1, wherein the control section sets the switching frequency of the main switch to an upper limit frequency when the current flowing into the AC power supply or the current flowing into the rectifier circuit or the current flowing into the main switch is an upper setting current or more, the control section gradually changes the switching frequency from a lower limit frequency to the upper limit frequency when the current ranges from a lower limit setting current to the upper limit setting current, and the control section stops a switching operation of the main switch when the current is below the lower limit setting current.

6. The power factor improving circuit according to claim 1, wherein the control section sets the switching frequency of the main switch to a minimum frequency when the current flowing into the AC power supply, the current flowing into the rectifier circuit, or the current flowing into the main switch is equal to or less than a predetermined current, and the control section sets the switching frequency of the main switch to a maximum frequency when the current exceeds the predetermined current.

7. The power factor improving circuit according to claim 1, wherein the boost reactor has a characteristic which reduces an inductance value when the value of the current flowing into the boost reactor is increased.

8. The power factor improving circuit according to claim 1, wherein the control section reduces the switching frequency of the main switch when an average value of the current flowing into the AC power supply, that of the current flowing into the rectifier circuit, or that of the current flowing into the main switch is less than or equal to a predetermined value.

9. The power factor improving circuit according to claim 1, wherein the control section stops a switching operation of the main switch when an average value of the current flowing into the AC power supply, that of the current flowing into the rectifier circuit, or that of the current flowing into the main switch is equal to or less than a predetermined value, and the control section starts the switching operation of the main switch when the output voltage is less than a predetermined voltage.

10. The power factor improving circuit according to claim 1, wherein the control section comprises:
a current detecting section which detects the current flowing into the AC power supply, the current flowing into the rectifier, or the current flowing into the main switch;
an error voltage generating section which amplifies an error between the output voltage and a first reference voltage to generate an error voltage signal;
a current detection amplifying section which amplifies an error between a voltage, which is proportional to the current detected by the current detecting section, and a second reference voltage to output a voltage amplifying signal;
a voltage varying section which outputs a voltage signal obtained by varying the voltage amplifying signal of the current detection amplifying section according to a value of the error voltage signal from the error voltage generating section, as the second reference voltage to the current detection amplifying section;
a frequency control section which generates a frequency control signal obtained by changing the switching frequency of the main switch according to the value of the current detected by the current detecting section; and
a pulse width control section which controls a pulse width according to the value of the voltage amplifying signal of the current detection amplifying section, generates a pulse signal obtained by changing the switching frequency of the main switch according to the frequency control signal generated by the frequency control section, and applies the pulse signal to the main switch to control the output voltage to a predetermined voltage.

11. The power factor improving circuit according to claim 2, wherein the control section comprises:
an error voltage generating section which amplifies an error between the output voltage and a reference voltage to generate an error voltage signal;
a current detecting section which detects the current flowing into the AC power supply, the current flowing into the rectifier circuit, or the current flowing into the main switch;
a frequency control section which generates a frequency control signal obtained by changing the switching frequency of the main switch according to the value of the current detected by the current detecting section; and
a pulse width control section which controls a pulse width based on the error voltage signal of the error voltage generating section and generates a pulse signal obtained by changing the switching frequency of the main switch according to the frequency control signal generated by the frequency control section, and applies the pulse signal to the main switch to control the output voltage to a predetermined voltage.

12. The power factor improving circuit according to claim 2, wherein the control section sets the switching frequency of the main switch to a lower limit frequency when the current flowing into the AC power supply, the current flowing into the rectifier circuit, or the current flowing into the main switch is a lower limit setting current or less, the control section sets the switching frequency to an upper limit frequency when the current is an upper limit current or more, and the control section gradually changes the switching frequency from the lower limit frequency to the upper limit frequency when the current ranges from the lower limit setting current to the upper limit setting current.

13. The power factor improving circuit according to claim 2, wherein the control section sets the switching frequency of the main switch to an upper limit frequency when the current flowing into the AC power supply or the current flowing into the rectifier circuit or the current flowing into the main switch is an upper setting current or more, the control section gradually changes the switching frequency from a lower limit frequency to the upper limit frequency when the current ranges from a lower limit setting current to the upper limit setting current, and the control section stops a switching operation of the main switch when the current is below the lower limit setting current.

14. The power factor improving circuit according to claim 2, wherein the control section sets the switching frequency of the main switch to a minimum frequency when the current flowing into the AC power supply, the current flowing into the rectifier circuit, or the current flowing into the main switch is equal to or less than a predetermined current, and the control section sets the switching frequency of the main switch to a maximum frequency when the current exceeds the predetermined current.

15. The power factor improving circuit according to claim 2, wherein the boost reactor has a characteristic which reduces an inductance value when the value of the current flowing into the boost reactor is increased.

16. The power factor improving circuit according to claim 2, wherein the control section reduces the switching frequency of the main switch when an average value of the current flowing into the AC power supply, that of the current flowing into the rectifier circuit, or that of the current flowing into the main switch is equal to or less than a predetermined value.

17. The power factor improving circuit according to claim 2, wherein the control section stops a switching operation of the main switch when an average value of the current flowing into the AC power supply, that of the current flowing into the rectifier circuit, or that of the current flowing into the main switch is equal to or less than a predetermined value, and the control section starts the switching operation of the main switch when the output voltage is equal to or less than a predetermined voltage.

18. The power factor improving circuit according to claim 2, wherein the control section comprises:
　a current detecting section which detects the current flowing into the AC power supply, the current flowing into the rectifier, or the current flowing into the main switch;
　an error voltage generating section which amplifies an error between the output voltage and a first reference voltage to generate an error voltage signal;
　a current detection amplifying section which amplifies an error between a voltage, which is proportional to the current detected by the current detecting section, and a second reference voltage to output a voltage amplifying signal;
　a voltage varying section which outputs a voltage signal obtained by varying the voltage amplifying signal of the current detection amplifying section according to a value of the error voltage signal from the error voltage generating section, as the second reference voltage to the current detection amplifying section;
　a frequency control section which generates a frequency control signal obtained by changing the switching frequency of the main switch according to the value of the current detected by the current detecting section; and
　a pulse width control section which controls a pulse width according to the value of the voltage amplifying signal of the current detection amplifying section, generates a pulse signal obtained by changing the switching frequency of the main switch according to the frequency control signal generated by the frequency control section, and applies the pulse signal to the main switch to control the output voltage to a predetermined voltage.

* * * * *